(12) United States Patent
Suzuki

(10) Patent No.: US 12,187,121 B2
(45) Date of Patent: Jan. 7, 2025

(54) VEHICLE CONTROL SYSTEM, METHOD AND STORAGE MEDIUM FOR DETERMINATION AND DISPLAY OF DRIVER GRIP ON A STEERING OPERATION ELEMENT

(71) Applicant: HONDA MOTOR CO., LTD., Tokyo (JP)

(72) Inventor: Takeyuki Suzuki, Tokyo (JP)

(73) Assignee: HONDA MOTOR CO., LTD., Tokyo (JP)

(*) Notice: Subject to any disclaimer, the term of this patent is extended or adjusted under 35 U.S.C. 154(b) by 169 days.

(21) Appl. No.: 17/973,565

(22) Filed: Oct. 26, 2022

(65) Prior Publication Data

US 2023/0142656 A1    May 11, 2023

(30) Foreign Application Priority Data

Nov. 11, 2021   (JP) .................... 2021-184167

(51) Int. Cl.
*B60K 35/00*    (2024.01)
*B60K 35/28*    (2024.01)
(Continued)

(52) U.S. Cl.
CPC .............. *B60K 35/00* (2013.01); *B62D 6/008* (2013.01); *B62D 15/029* (2013.01); *B60K 35/28* (2024.01);
(Continued)

(58) Field of Classification Search
CPC ........ B60K 30/09; B60K 30/10; B60K 30/12; B60K 30/165; B60K 30/182;
(Continued)

(56) References Cited

U.S. PATENT DOCUMENTS 6,300,939 B1    10/2001    Decker et al.
9,452,678 B1*   9/2016    Boss .................. G06F 3/012
(Continued)

FOREIGN PATENT DOCUMENTS

JP    2009-023412    2/2009
JP    2015-182624    10/2015
(Continued)

OTHER PUBLICATIONS

Japanese Notice of Allowance for Japanese Patent Application No. 2021-184167 mailed Sep. 12, 2023.

*Primary Examiner* — Stephen R Burgdorf
(74) *Attorney, Agent, or Firm* — Amin, Turocy & Watson, LLP

(57) ABSTRACT

A vehicle control system includes a steering operation element configured to receive a steering operation of a vehicle by a driver, a grip detector configured to detect a gripping state of the steering operation element by the driver of the vehicle, and a display processor configured to cause a display device to display a notification image indicating at least the gripping state. The notification image includes a first graphic deformable based on a circle within an entire image area. The display processor causes the display device to display the notification image including the first graphic deformed to expand a location corresponding to a part where the driver is gripping the steering operation element.

10 Claims, 10 Drawing Sheets

(51) Int. Cl.
*B60K 35/29* (2024.01)
*B62D 6/00* (2006.01)
*B62D 15/02* (2006.01)

(52) U.S. Cl.
CPC ........ *B60K 35/29* (2024.01); *B60K 2360/178* (2024.01); *B60K 2360/188* (2024.01); *B60K 2360/191* (2024.01)

(58) Field of Classification Search
CPC .... B60K 30/1863; B60K 35/00; B60K 35/10; B60K 35/22; B60K 35/28; B60K 35/29; B60K 35/60; B60K 50/00; B60K 50/08; B60K 50/14; B60K 2360/48; B60K 2360/175; B60K 2360/187; B60K 2360/188; B60K 2360/191; B60K 2360/782; B60W 40/08; B60W 50/14; B60W 2050/146; B60W 2540/233; B62D 1/046; B62D 6/008; B62D 15/025; B62D 15/0255; B62D 15/029
USPC ........................................................ 340/438
See application file for complete search history.

(56) References Cited

U.S. PATENT DOCUMENTS

| | | | | |
|---|---|---|---|---|
| 2014/0121903 | A1* | 5/2014 | Lee | B60K 35/00 |
| | | | | 701/41 |
| 2017/0334453 | A1 | 11/2017 | Mimura et al. | |
| 2018/0253094 | A1* | 9/2018 | Chang | G06V 40/10 |
| 2018/0284965 | A1 | 10/2018 | Nagasawa | |
| 2018/0326851 | A1* | 11/2018 | Kim | B60K 35/60 |
| 2019/0004514 | A1 | 1/2019 | Hiwatashi et al. | |
| 2019/0291580 | A1* | 9/2019 | Sugimoto | B60K 35/10 |
| 2020/0023830 | A1 | 1/2020 | Breisinger et al. | |
| 2022/0063649 | A1* | 3/2022 | Takabatake | B60W 60/0053 |

FOREIGN PATENT DOCUMENTS

| | | |
|---|---|---|
| JP | 2017-207885 | 11/2017 |
| JP | 2018-103646 | 7/2018 |
| JP | 2018-167822 | 11/2018 |
| JP | 2019-010929 | 1/2019 |
| JP | 2019-142271 | 8/2019 |
| JP | 2021-046042 | 3/2021 |
| JP | 2021-049894 | 4/2021 |

* cited by examiner

FIG. 4

| DRIVING MODE | | MODE A | MODE B | MODE C | MODE D | MODE E |
|---|---|---|---|---|---|---|
| TASK | | LIGHT →→→→→→→→→→→→→→→→→→→→→→→→→→→→→→→→→→→→ HEAVY | | | | |
| | | FORWARD MONITORING: UNNECESSARY STEERING GRIP: UNNECESSARY | FORWARD MONITORING: NECESSARY STEERING GRIP: UNNECESSARY | FORWARD MONITORING: NECESSARY STEERING GRIP: NECESSARY | FORWARD MONITORING: AT LEAST CERTAIN DEGREE OF DRIVING OPERATION IS NECESSARY | FORWARD MONITORING: NECESSARY DRIVING OPERATION IS NECESSARY TOGETHER WITH STEERING AND ACCELERATION/DECELERATION |
| DRIVER'S MOTIVATION | | LOW →→→→→→→→→→→→→→→→→→→→→→→→→→→→→→→→→→→→→→→ HIGH | | | | |
| DRIVING ASSISTANCE | LONGITUDINAL SYSTEM ASSISTANCE | | | | | |
| | LATERAL SYSTEM ASSISTANCE | | | | | |
| | AMOUNT OF INTERVENTION | | | | | |
| TRAVELING MODE | | COMFORT | COMFORT | | SPORT | CHANGEABLE (DRIVER) |
| RESPONSE/ FEEDBACK | | | | | | (BASED ON TRAVELING MODE) |

FIG. 6

| DRIVING MODE | | MODE A | MODE B | MODE C | | | MODE D | | MODE E |
|---|---|---|---|---|---|---|---|---|---|
| ADAS | | SOMETHING NOT QUESTIONED | ABSENCE | ON | | | | | OFF |
| GRIPPING STATE OF STEERING WHEEL | PRESENCE OR ABSENCE OF GRIPPING | SOMETHING NOT QUESTIONED | ABSENCE | PRESENCE | | | | | — |
| | NUMBER OF GRIPS | SOMETHING NOT QUESTIONED | 0 | 1 | | | 2 | | — |
| | GRIPPING POSITION | SOMETHING NOT QUESTIONED | ABSENCE | UPPER OR LOWER OR | RIGHT OR LEFT OR | | UPPER AND/ OR LOWER | LEFT/RIGHT | — |
| VISUAL LINE DIRECTION | | SOMETHING NOT QUESTIONED | | | FRONT | | | | — |
| MOTIVATION LEVEL | | 1 | 2 | 3 | 4 | 5 | 5 | 6 | 7 |

FIG. 7
| MOTIVATION LEVEL | NOTIFICATION IMAGE |
|---|---|
| 1 | 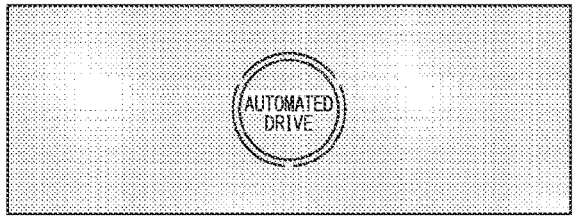 |
| 2 |  |
| 3 | 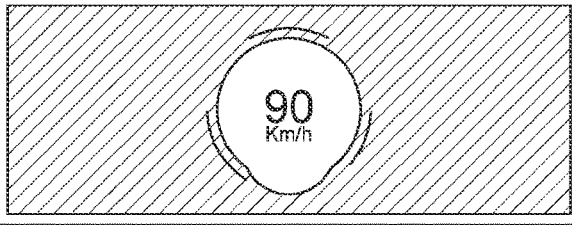 |
| 4 | 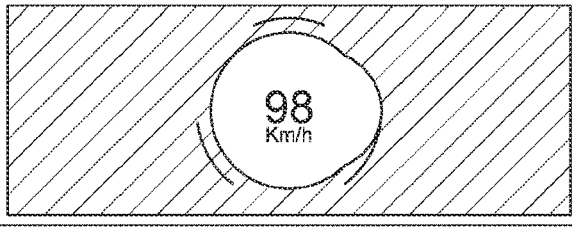 |
| 5 | 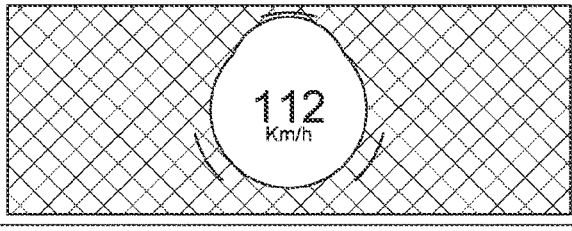 |
| 6 | 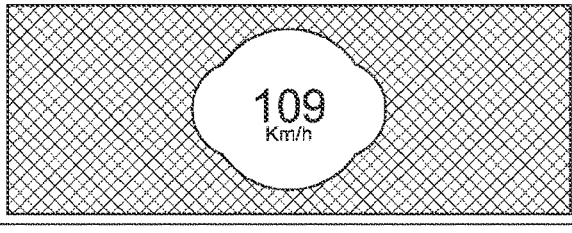 |
| 7 | 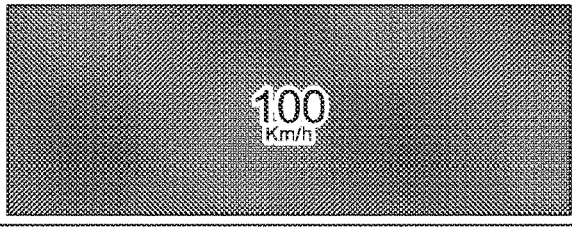 |

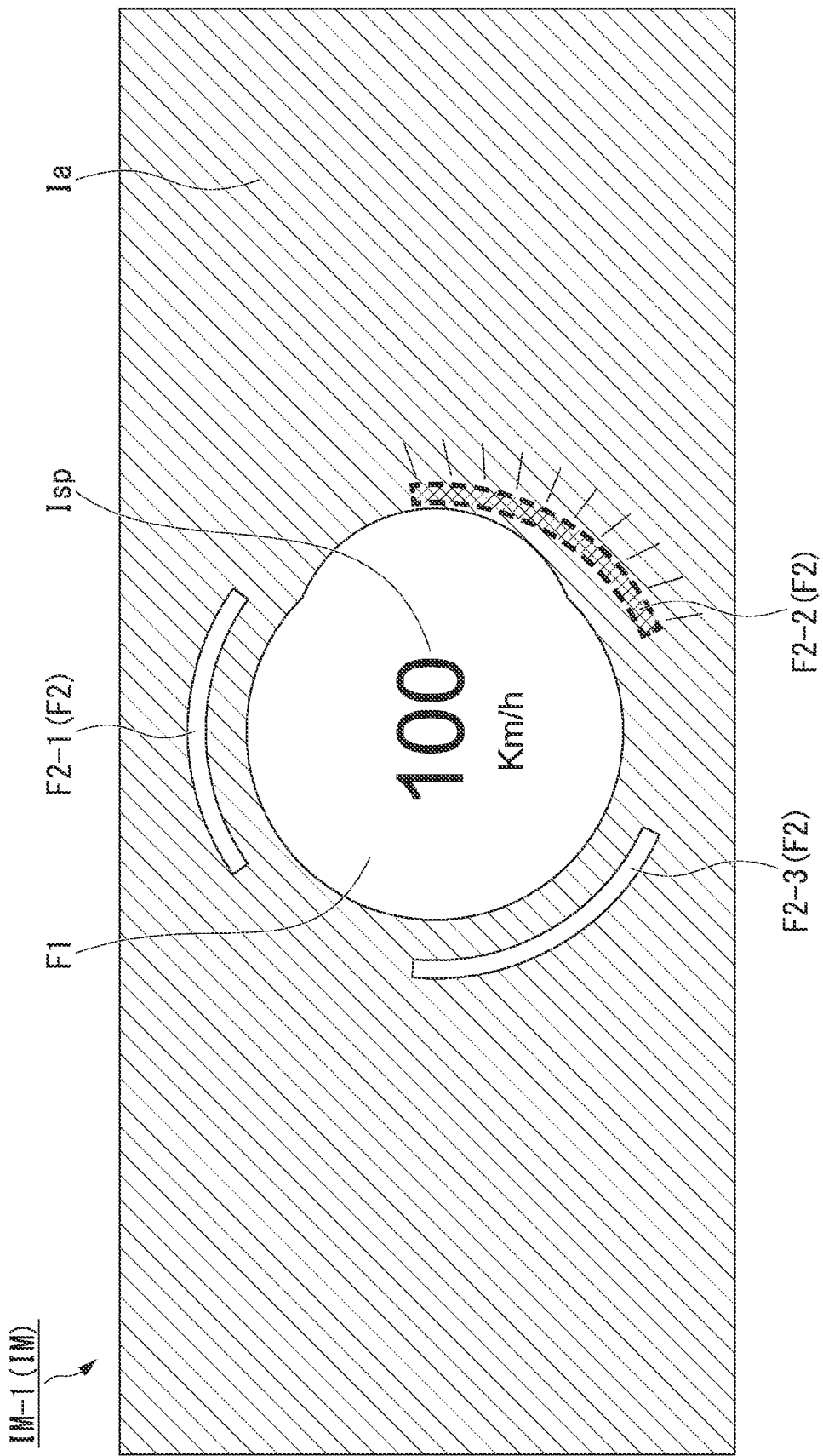

VEHICLE CONTROL SYSTEM, METHOD AND STORAGE MEDIUM FOR DETERMINATION AND DISPLAY OF DRIVER GRIP ON A STEERING OPERATION ELEMENT

CROSS-REFERENCE TO RELATED APPLICATION

Priority is claimed on Japanese Patent Application No. 2021-184167, filed Nov. 11, 2021, the content of which is incorporated herein by reference.

BACKGROUND OF THE INVENTION

Field of the Invention

The present invention relates to a vehicle control system, a vehicle control method, and a storage medium.

Description of Related Art

In the related art, for example, technology related to a vehicle control system in which a display unit is attached to an operation element such as a steering wheel and a current traveling situation in which the vehicle is traveling is presented to a driver who is an occupant has been disclosed (for example, Japanese Unexamined Patent Application, First Publication No. 2021-046042). In the related art, a vehicle speed meter indicating a traveling speed of a host vehicle is not displayed on a display unit when the vehicle is traveling in a driving mode of automated driving and the vehicle speed meter is displayed on the display unit when the vehicle is traveling in a driving mode of manual driving.

However, in the related art, the driver can easily confirm the current traveling speed of the host vehicle when the vehicle is allowed to travel in manual driving, but there is no display process of determining a sense of purpose such as a driver's desire to actively perform a vehicle driving operation and informing or reminding the driver of the determined sense of purpose.

SUMMARY OF THE INVENTION

The present invention has been made on the basis of the recognition of the above problems and an objective of the present invention is to provide a vehicle control system, a vehicle control method, and a storage medium capable of determining a driver's sense of purpose for driving and presenting a determination result to the driver.

A vehicle control system, a vehicle control method, and a storage medium according to the present invention adopt the following configurations.

(1): According to an aspect of the present invention, there is provided a vehicle control system including: a steering operation element configured to receive a steering operation of a vehicle by a driver; a grip detector configured to detect a gripping state of the steering operation element by the driver of the vehicle; and a display processor configured to cause a display device to display a notification image indicating at least the gripping state, wherein the notification image includes a first graphic deformable based on a circle within an entire image area, and wherein the display processor causes the display device to display the notification image including the first graphic deformed to expand a location corresponding to a part where the driver is gripping the steering operation element.

(2): In the above-described aspect (1), the grip detector detects the gripping state for each of a plurality of parts into which the steering operation element is divided and the display processor increases the diameter of the circle in the first graphic as the number of parts in which the steering operation element is detected to be gripped increases (3): In the above-described aspect (2), the grip detector detects the gripping state in each of a first gripping part in an upper region of the steering operation element, a second gripping part in a right region of the steering operation element, a third gripping part in a lower region of the steering operation element, and a fourth gripping part in a left region of the steering operation element and the display processor changes the diameter of the circle in the first graphic based on a gripping position of the steering operation element and the number of grips of the driver.

(4): In the above-described aspect (3), if the number of grips is 2, the display processor changes the diameter of the circle in the first graphic to a longest first length when the gripping position corresponds to the second gripping part and the fourth gripping part and changes the diameter of the circle in the first graphic to a second length shorter than the first length when the gripping position corresponds to the first gripping part and/or the third gripping part, if the number of grips is 1, the display processor changes the diameter of the circle in the first graphic to a third length shorter than the second length when the gripping position corresponds to the second gripping part or the fourth gripping part and changes the diameter of the circle in the first graphic to a fourth length shorter than the third length when the gripping position corresponds to the first gripping part or the third gripping part, and if the number of grips is 0, the display processor changes the diameter of the circle in the first graphic to a fifth length shorter than the fourth length.

(5): In the above-described aspect (1), the display processor changes colors of the entire image area and/or the first graphic in accordance with the gripping state.

(6): In the above-described aspect (1), the vehicle control system further includes a traveling controller configured to perform traveling control related to steering and acceleration or deceleration of the vehicle determined based on the gripping state, wherein the notification image further includes a circular second graphic which is located outside of the first graphic in a radial direction of the circle and in which at least lengths of diameters of inner and outer circles and degrees of definition of the inner and outer circles can be changed, and wherein the display processor causes the display device to display the notification image including the first graphic and the second graphic obtained by changing any one of the length of the diameter of the inner circle, the length of the diameter of the outer circle, and the degrees of definition in accordance with a state of the determined traveling control.

(7): In the above-described aspect (6), the second graphic is divided into at least a right area and a left area, the traveling controller causes the steering operation element to generate a reaction force such that a traveling direction of the vehicle becomes a straight direction when the steering operation element has been operated in a direction outside of the straight direction by the driver using the straight direction of the vehicle as a reference, and the display processor highlights one of the right area and the left area corresponding to a direction in which the traveling controller causes the reaction force to be generated.

(8): In the above-described aspect (7), the traveling controller causes the reaction force generated by the steering operation element to stop when a driver's operation on the steering operation element in the direction outside of the straight direction has continued and the display processor causes a color of an image area on a side of the highlighted area within the entire image area of the notification image to be changed to a color different from that of another image area.

(9): According to an aspect of the present invention, there is provided a vehicle control method including: receiving, by a computer mounted in a vehicle, a steering operation on a steering operation element of the vehicle by a driver; detecting, by the computer, a gripping state of the steering operation element by the driver of the vehicle; and when a display device is allowed to display a notification image indicating at least the gripping state and including a first graphic deformable based on a circle within an entire image area, causing, by the computer, the display device to display the notification image including the first graphic deformed to expand a location corresponding to a part where the driver is gripping the steering operation element.

(10): According to an aspect of the present invention, there is provided a non-transitory computer-readable storage medium storing a program for causing a computer mounted in a vehicle to: receive a steering operation on a steering operation element of the vehicle by a driver; detect a gripping state of the steering operation element by the driver of the vehicle; and when a display device is allowed to display a notification image indicating at least the gripping state and including a first graphic deformable based on a circle within an entire image area, cause the display device to display the notification image including the first graphic deformed to expand a location corresponding to a part where the driver is gripping the steering operation element.

According to the above-described aspects (1) to (10), it is possible to determine a driver's sense of purpose for driving and present a determination result to the driver.

BRIEF DESCRIPTION OF THE DRAWINGS

FIG. 4 is a diagram showing an example of corresponding relationships between driving modes, driving assistance, and traveling modes.

FIG. 6 is a diagram showing an example of determination patterns for determining a driver's motivation.

FIG. 7 is a diagram showing an example of a notification image corresponding to a driver's motivation.

FIG. 10 is an example showing an example of a notification image when a notification of a change in a traveling state of a vehicle is provided.

DETAILED DESCRIPTION OF THE INVENTION

Embodiments of a vehicle control system, a vehicle control method, and a storage medium of the present invention will be described below with reference to the drawings. As used throughout this disclosure, the singular forms "a," "an," and "the" include a plurality of references unless the context clearly dictates otherwise.

[Overall Configuration]

Figure 1:
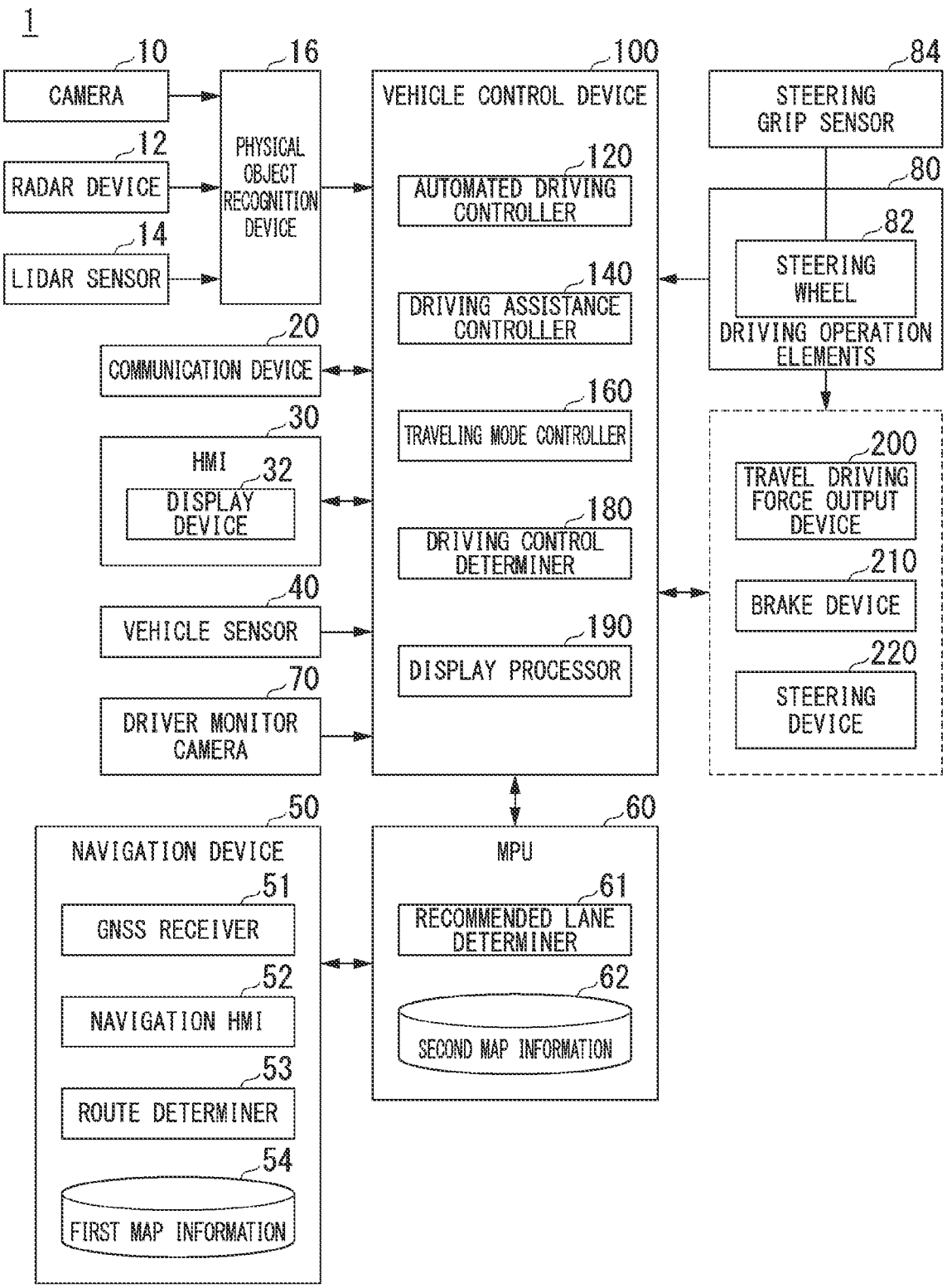
FIG. 1 is a configuration diagram of a vehicle system using a vehicle control device according to an embodiment.

FIG. 1 is a configuration diagram of a vehicle system 1 using the vehicle control system according to an embodiment. A vehicle in which the vehicle system 1 is mounted is, for example, a vehicle such as a two-wheeled vehicle, a three-wheeled vehicle, or a four-wheeled vehicle, and a drive source thereof is an internal combustion engine such as a diesel engine or a gasoline engine, an electric motor, or a combination thereof. The electric motor operates using electric power generated by a power generator connected to the internal combustion engine or electric power when a secondary battery or a fuel cell is discharged.

For example, the vehicle system 1 includes a camera 10, a radar device 12, a light detection and ranging (LIDAR) sensor 14, a physical object recognition device 16, a communication device 20, a human machine interface (HMI) 30, a vehicle sensor 40, a navigation device 50, a map positioning unit (MPU) 60, a driver monitor camera 70, driving operation elements 80, a vehicle control device 100, a travel driving force output device 200, a brake device 210, and a steering device 220. Such devices and equipment are connected to each other by a multiplex communication line such as a controller area network (CAN) communication line, a serial communication line, or a wireless communication network. The configuration shown in FIG. 1 is merely an example and some of the components may be omitted or other components may be further added.

For example, the camera 10 is a digital camera using a solid-state imaging element such as a charge-coupled device (CCD) or a complementary metal-oxide semiconductor (CMOS). The camera 10 is attached to any location on the vehicle (hereinafter referred to as a host vehicle M) in which the vehicle system 1 is mounted. When the view in front of the host vehicle M is imaged, the camera 10 is attached to an upper part of a front windshield, a rear surface of a rearview mirror, or the like. For example, the camera 10 periodically and iteratively images the surroundings of the host vehicle M. The camera 10 may be a stereo camera.

The radar device 12 radiates radio waves such as millimeter waves around the host vehicle M and detects at least the position (the distance to and the direction) of a physical object by detecting radio waves (reflected waves) reflected by the physical object. The radar device 12 is attached to any location on the host vehicle M. The radar device 12 may detect the position and the speed of the physical object in a frequency modulated continuous wave (FM-CW) scheme.

The LIDAR sensor 14 radiates light (or electromagnetic waves having a wavelength close to light) to the vicinity of the host vehicle M and measures scattered light. The LIDAR sensor 14 detects a distance to an object on the basis of time from light emission to light reception. The radiated light is, for example, pulsed laser light. The LIDAR sensor 14 is attached to any location on the host vehicle M.

The physical object recognition device 16 performs a sensor fusion process on detection results from some or all of the camera 10, the radar device 12, and the LIDAR sensor 14 to recognize the position, a type, the speed, and the like of a physical object. The physical object recognition device 16 outputs recognition results to the vehicle control device 100. The physical object recognition device 16 may output detection results of the camera 10, the radar device 12, and the LIDAR sensor 14 to the vehicle control device 100 as they are. The physical object recognition device 16 may be omitted from the vehicle system 1.

The communication device 20 communicates with another vehicle located in the vicinity of the host vehicle M, or communicates with various types of server devices via a radio base station, using, for example, a cellular network or a Wi-Fi network, Bluetooth (registered trademark), dedicated short range communication (DSRC), or the like.

The HMI 30 presents various types of information to an occupant of the host vehicle M and receives an input operation by the occupant. The HMI 30 includes various types of display devices, a speaker, a buzzer, a touch panel, a switch, keys, and the like. In FIG. 1, a display device 32 provided in the HMI 30 is shown. The display device 32 is provided, for example, in the central portion of an instrument panel of the host vehicle M, and is a so-called information display that is a display device for displaying various types of information in the host vehicle M such as a speedometer indicating the traveling speed of the host vehicle M or a tachometer indicating the number of revolutions (a rotational speed) of the internal combustion engine provided in the host vehicle M.

The vehicle sensor 40 includes a vehicle speed sensor configured to detect the speed of the host vehicle M, an acceleration sensor configured to detect acceleration, a yaw rate sensor configured to detect angular velocity around a vertical axis, a direction sensor configured to detect a direction of the host vehicle M, and the like.

For example, the navigation device 50 includes a global navigation satellite system (GNSS) receiver 51, a navigation HMI 52, and a route determiner 53. The navigation device 50 stores first map information 54 in a storage device such as a hard disk drive (HDD) or a flash memory. The GNSS receiver 51 identifies the position of the host vehicle M based on a signal received from a GNSS satellite. The position of the host vehicle M may be identified or corrected by an inertial navigation system (INS) using an output of the vehicle sensor 40. The navigation HMI 52 includes a display device, a speaker, a touch panel, keys, and the like. The navigation HMI 52 may be partly or wholly shared with the above-described HMI 30. For example, the route determiner 53 determines on a route (hereinafter referred to as a route on a map) from the position of the host vehicle M identified by the GNSS receiver 51 (or any input position) to a destination input by the occupant using the navigation HMI 52 with reference to the first map information 54. The first map information 54 is, for example, information in which a road shape is expressed by a link indicating a road and nodes connected by the link. The first map information 54 may include the curvature of a road, point of interest (POI) information, and the like. The route on the map is output to the MPU 60. The navigation device 50 may perform route guidance using the navigation HMI 52 on the basis of the route on the map. The navigation device 50 may be implemented, for example, according to a function of a terminal device such as a smartphone or a tablet terminal possessed by the occupant. The navigation device 50 may transmit a current position and a destination to a navigation server via the communication device 20 and acquire a route equivalent to the route on the map from the navigation server.

For example, the MPU 60 includes a recommended lane determiner 61 and stores second map information 62 in a storage device such as an HDD or a flash memory. The recommended lane determiner 61 divides the route on the map provided from the navigation device 50 into a plurality of blocks (for example, divides the route every 100 [m] in a traveling direction of the vehicle), and determines on a recommended lane for each block with reference to the second map information 62. The recommended lane determiner 61 determines in what lane numbered from the left the vehicle will travel. The recommended lane determiner 61 determines on the recommended lane such that the host vehicle M can travel along a reasonable route for traveling to a branching destination when there is a branch point in the route on the map.

The second map information 62 is map information having higher accuracy than the first map information 54. For example, the second map information 62 includes information about a center of a lane, information about a boundary of a lane, and the like. The second map information 62 may include road information, traffic regulations information, address information (an address/postal code), facility information, telephone number information, information about a prohibition section where mode A or mode B is prohibited to be described below, and the like. The second map information 62 may be updated at any time when the communication device 20 communicates with another device.

The driver monitor camera 70 is, for example, a digital camera that uses a solid-state image sensor such as a CCD or a CMOS. The driver monitor camera 70 is attached to any location on the host vehicle M with respect to the position and a direction where the head of the occupant (hereinafter, the driver) sitting in the driver's seat of the host vehicle M can be imaged from the front (in a direction in which his/her face is imaged). For example, the driver monitor camera 70 is attached to an upper part of a display device provided on the central portion of the instrument panel of the host vehicle M. The driver monitor camera 70 outputs an image obtained by imaging the cabin including the driver of the host vehicle M captured from the position where the driver monitor camera 70 is disposed to the vehicle control device 100.

For example, the driving operation elements 80 include an accelerator pedal, a brake pedal, a shift lever, and other operation elements in addition to a steering wheel 82. A sensor configured to detect an amount of operation or the presence or absence of an operation is attached to the driving operation element 80 and a detection result thereof is output to the vehicle control device 100 or some or all of the travel driving force output device 200, the brake device 210, and the steering device 220. The steering wheel 82 does not necessarily have to be annular and may be in the form of a variant steering wheel, a joystick, a button, or the like. A steering grip sensor 84 is attached to the steering wheel 82. The steering grip sensor 84 is implemented by a capacitance sensor, a voltage sensor, or the like and outputs a signal for detecting whether or not the driver is gripping the steering wheel 82 (indicating that the driver is in contact with the steering wheel 82 in a state in which a force is applied) to the vehicle control device 100. The steering wheel 82 is an example of a "steering operation element" and the steering grip sensor 84 is an example of a "grip detector."

The vehicle control device 100 includes, for example, an automated driving controller 120, a driving assistance controller 140, a traveling mode controller 160, a driving control determiner 180, and a display processor 190. Each of the automated driving controller 120, the driving assistance controller 140, the traveling mode controller 160, the driving control determiner 180, and the display processor 190 is implemented, for example, by a hardware processor such as a central processing unit (CPU) executing a program (software). Some or all of these components may be implemented by hardware (including a circuit; circuitry) such as a large-scale integration (LSI) circuit, an application specific integrated circuit (ASIC), a field-programmable gate array (FPGA), or a graphics processing unit (GPU) or may be implemented by software and hardware in cooperation. The program may be pre-stored in a storage device (a storage device including a non-transitory storage medium) such as an HDD or a flash memory of the vehicle control device 100 or may be stored in a removable storage medium such as a DVD or a CD-ROM and installed in the HDD or the flash memory of the vehicle control device 100 when the storage medium (the non-transitory storage medium) is mounted in a drive device.

Figure 2:
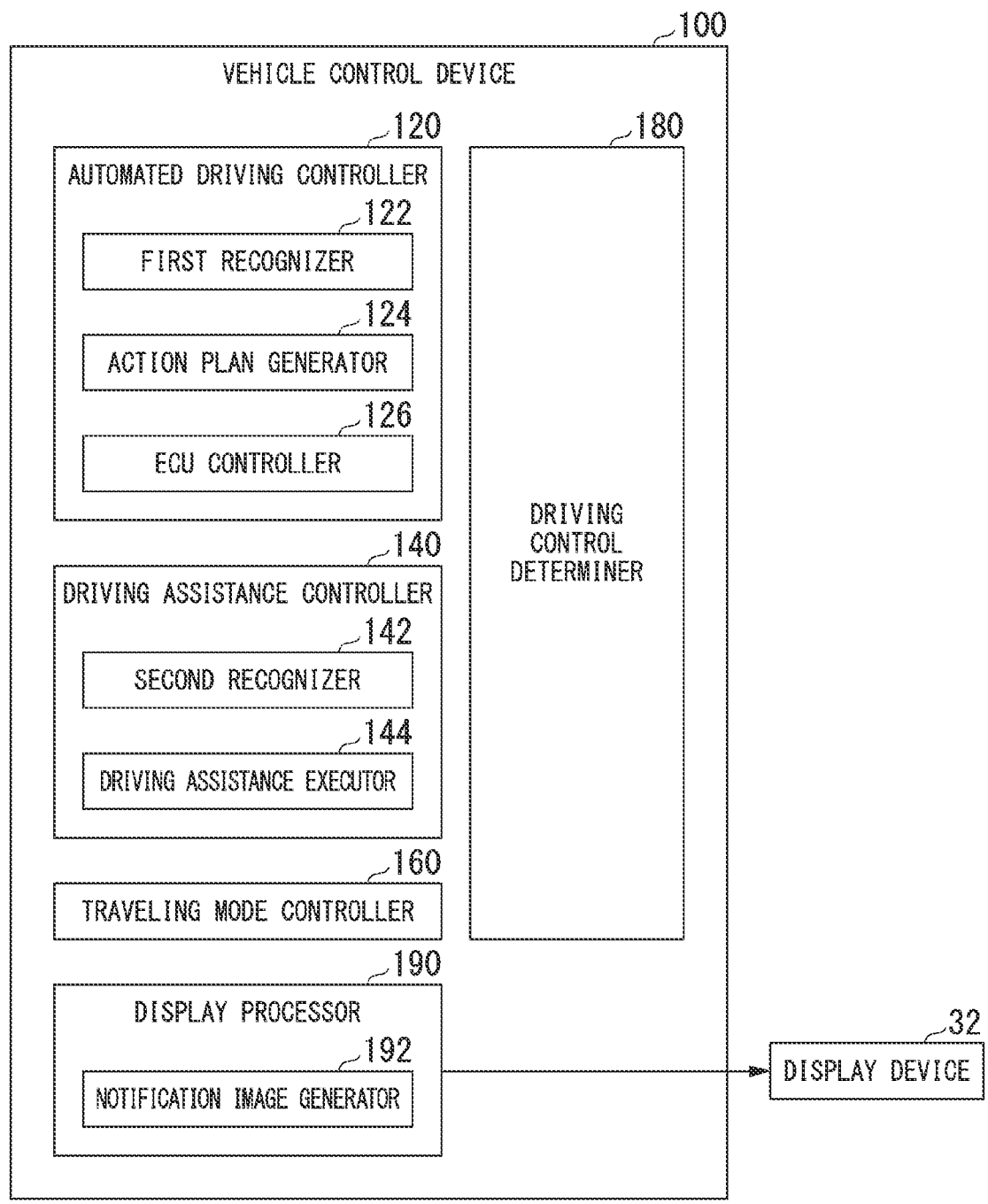
FIG. 2 is a functional configuration diagram of the vehicle control device.

FIG. 2 is a functional configuration diagram of the vehicle control device 100. The automated driving controller 120 includes, for example, a first recognizer 122, the action plan generator 124, and an electronic control unit (ECU) controller 126. The driving assistance controller 140 includes, for example, a second recognizer 142 and a driving assistance executor 144. The display processor 190 includes, for example, a notification image generator 192. For example, the automated driving controller 120 and the driving assistance controller 140 implement a function based on artificial intelligence (AI) and a function based on a previously given model in parallel. For example, an "intersection recognition" function in the automated driving controller 120 may be implemented by executing intersection recognition based on deep learning or the like and recognition based on previously given conditions (signals, road markings, or the like, with which pattern matching is possible) in parallel and performing comprehensive evaluation by assigning scores to both recognitions. Thereby, the reliability of automated driving is secured. For example, the function of "recognizing the driver's motivation and sense of purpose (i.e., the driver's motivation for driving) to drive the host vehicle M" in the driving control determiner 180 may also be similarly implemented by recognizing the driver's face (facial expression) through deep learning, pattern matching, or the like.

The first recognizer 122 recognizes states of positions, speeds, acceleration, and the like of physical objects near the host vehicle M on the basis of information input from the camera 10, the radar device 12, and the LIDAR sensor 14 via the physical object recognition device 16. For example, the position of the physical object is recognized as the absolute coordinates of a representative point (the center of gravity, the driving shaft center, or the like) of the host vehicle M as the origin and is used for control. The position of the physical object may be represented by a representative point such as the center of gravity or a corner of the physical object or may be represented by a represented area. The "state" of a physical object may include acceleration or jerk of the physical object or an "action state" (for example, whether or not a lane change is being made or intended).

For example, the first recognizer 122 recognizes a lane in which the host vehicle M is traveling (a traveling lane). For example, the first recognizer 122 recognizes the traveling lane by comparing a pattern of a road marking (for example, an arrangement of solid lines and broken lines) obtained from the second map information 62 with a pattern of road markings in the vicinity of the host vehicle M recognized from an image captured by the camera 10. The first recognizer 122 may recognize a traveling lane by recognizing a traveling path boundary (a road boundary) including a road marking, a road shoulder, a curb, a median strip, a guardrail, or the like as well as a road marking. In this recognition, the position of the host vehicle M acquired from the navigation device 50 or a processing result of the INS may be added.

Also, the first recognizer 122 recognizes a temporary stop line, an obstacle, a red traffic light, a toll gate, and other road events.

When the traveling lane is recognized, the first recognizer 122 recognizes the position or orientation of the host vehicle M with respect to the traveling lane. For example, the first recognizer 122 may recognize a gap of a reference point of the host vehicle M from the center of the lane and an angle formed with respect to a line connected to the center of the lane in the traveling direction of the host vehicle M as a relative position and orientation of the host vehicle M related to the traveling lane. Alternatively, the first recognizer 122 may recognize the position of the reference point of the host vehicle M related to one side end portion (a road marking or a road boundary) of the traveling lane or the like as a relative position of the host vehicle M related to the traveling lane.

The action plan generator 124 generates a future target trajectory along which the host vehicle M automatically travels (independently of the driver's operation) such that the host vehicle M can generally travel in the recommended lane determined on by the recommended lane determiner 61 and further cope with a surrounding situation of the host vehicle M. For example, the target trajectory includes a speed element. For example, the target trajectory is represented by sequentially arranging points (trajectory points) at which the host vehicle M is required to arrive. The trajectory points are points at which the host vehicle M is required to arrive for each prescribed traveling distance (for example, about several meters [m]) along a road. In addition, a target speed and target acceleration for each prescribed sampling time (for example, about several tenths of a second [sec]) are generated as parts of the target trajectory. The trajectory point may be a position at which the host vehicle M is required to arrive at the sampling time for each prescribed sampling time. In this case, information about the target speed or the target acceleration is represented by an interval between the trajectory points.

The action plan generator 124 may set an automated driving event when a target trajectory is generated. Automated driving events include a constant-speed traveling event, a low-speed tracking traveling event, a lane change event, a branch point-related movement event, a merging point-related movement event, a takeover event, and the like. The action plan generator 124 generates a target trajectory according to an activated event.

The ECU controller 126 controls the travel driving force output device 200, the brake device 210, and the steering device 220 such that the host vehicle M passes along the target trajectory generated by the action plan generator 124 at the scheduled times.

The ECU controller 126 includes, for example, a speed control function and a steering control function. The ECU controller 126 acquires information about a target trajectory (trajectory points) generated by the action plan generator 124 and causes a memory (not shown) to store the information. The ECU controller 126 controls the travel driving force output device 200 or the brake device 210 on the basis of a speed element associated with the target trajectory stored in the memory. The ECU controller 126 controls the steering device 220 in accordance with the degree of curvature of the target trajectory stored in the memory. A process of controlling a speed control function and a steering control function in the ECU controller 126 is implemented by, for example, a combination of feedforward control and feedback control. As an example, the steering control function is executed in a combination of feedforward control according to the curvature of the road in front of the host vehicle M and feedback control based on deviation from the target trajectory. Control of a steering control function of the ECU controller 126 is an example of "traveling control."

The travel driving force output device 200 outputs a travel driving force (torque) for enabling the vehicle to travel to the driving wheels. For example, the travel driving force output device 200 includes a combination of an internal combustion engine, an electric motor, a transmission, and the like, and an ECU that controls the internal combustion engine, the electric motor, the transmission, and the like. The ECU controls the above-described components in accordance with information input from the ECU controller 126 or information input from the driving operation element 80.

For example, the brake device 210 includes a brake caliper, a cylinder configured to transfer hydraulic pressure to the brake caliper, an electric motor configured to generate hydraulic pressure in the cylinder, and a brake ECU. The brake ECU controls the electric motor in accordance with the information input from the ECU controller 126 or the information input from the driving operation element 80 such that brake torque according to a braking operation is output to each wheel. The brake device 210 may include a mechanism configured to transfer the hydraulic pressure generated by an operation of the brake pedal included in the driving operation elements 80 to the cylinder via a master cylinder as a backup. Also, the brake device 210 is not limited to the above-described configuration and may be an electronically controlled hydraulic brake device configured to control an actuator in accordance with information input from the ECU controller 126 and transfer the hydraulic pressure of the master cylinder to the cylinder.

For example, the steering device 220 includes a steering ECU and an electric motor. For example, the electric motor changes the direction of steerable wheels by applying a force to a rack and pinion mechanism. The steering ECU drives the electric motor in accordance with the information input from the ECU controller 126 or the information input from the driving operation element 80 to change the direction of the steerable wheels.

The second recognizer 142 recognizes a state in which the driver is gripping the steering wheel 82 (hereinafter referred to as a "gripping state") on the basis of a signal input from the steering grip sensor 84. The gripping state includes, for example, information indicating whether or not the driver is gripping the steering wheel 82, such as information about a position where the driver is gripping the steering wheel 82 (hereinafter referred to as a "gripping position") and/or information about the number of grips when the driver is gripping the steering wheel 82 (hereinafter referred to as the "number of grips"). Gripping positions include positions in at least upper, right, lower, and left regions of the steering wheel 82. The number of grips is "0" when the driver is not gripping the steering wheel 82, "1" when the driver is gripping the steering wheel 82 with one hand, and "2" when the driver is gripping the steering wheel 82 with both hands. The gripping state is used to determine a driver's motivation for driving and generate a notification image to be described below.

The second recognizer 142 may recognize a direction of a visual line (hereinafter referred to as a "visual line direction") of the driver in the host vehicle M on the basis of the image input from the driver monitor camera 70. The visual line direction includes, for example, information indicating whether or not the driver's visual line when driving the host vehicle M is directed to the front. The second recognizer 142 analyzes an image captured by the driver monitor camera 70, performs a visual line estimation process, and recognizes the visual line direction of the driver. The visual line direction is used in addition to the gripping state in determining the driver's motivation for driving. The second recognizer 142 may perform a posture estimation process by analyzing the image captured by the driver monitor camera 70 and recognize a posture of the driver. The visual line direction and the driver's posture are used to determine whether or not the driver's state is a state corresponding to a driving mode.

The driving assistance executor 144 executes driving assistance for assisting the driver in driving the host vehicle M. As the driving assistance function, for example, functions of driving assistance systems for supporting the driving operation performed by the driver when the host vehicle M is allowed to travel, such as advanced driver-assistance systems (ADAS), are executed. ADAS include some or all functions for supporting specific driving operations such as adaptive cruise control (ACC), low speed following (LSF), a lane keeping assist system (LKAS), and road departure mitigation (RDM). These driving assistance functions are not so-called automated driving functions but are executed in the vehicle system 1 such that driving operations are supported. The driving assistance executor 144 controls the travel driving force output device 200, the brake device 210, and the steering device 220 in accordance with the degree (a level) of execution of these driving assistance functions. The driving assistance executor 144 is an example of a "traveling controller."

The traveling mode controller 160 controls the traveling mode when the host vehicle M is traveling in a state in which automated driving and/or driving assistance are being executed. The traveling mode is used to implement traveling performance required when the host vehicle M is allowed to travel by controlling (changing) one or more properties among, for example, various properties related to traveling such as rotational properties of an internal combustion engine or an electric motor, output properties of a travel driving force (torque), properties of a gear shift timing of the transmission, properties of a weight of the steering wheel 82 (output properties of a so-called rotation assist force of power steering or the like), and suspension hardness properties (i.e., damper hardness properties). Traveling modes include, for example, a normal traveling mode, a sport traveling mode, a comfort traveling mode, and the like. The normal traveling mode is, for example, a traveling mode in which the host vehicle M is allowed to travel while balancing traveling performance and comfort. In the normal traveling mode, for example, each property is set as a normal (standard, for example, initial value) property such that a general ride comfort can be obtained with normal traveling performance. The sport traveling mode is, for example, a traveling mode in which the host vehicle M is allowed to travel by prioritizing a process of exhibiting higher traveling performance than in the normal traveling mode. In the sport traveling mode, for example, a setting process of setting the rotational speed of the internal combustion engine, the electric motor, or the like as a higher rotational speed, setting the output of the torque as a higher output, setting a gear shift timing of the transmission to a timing for a high rotational speed range in the internal combustion engine or the electric motor, making the steering wheel 82 heavier, or making a damper stiffer is performed such that sporty ride comfort such as the sharpness of a response and feedback for the driver's driving operation, the sharpness of acceleration of the host vehicle M, and the high stability of high-speed traveling is obtained. The comfort traveling mode is, for example, a traveling mode in which the host vehicle M is allowed to travel by prioritizing a process of obtaining higher comfort (which may include the possibility of higher mileage or longer-distance traveling) than in the normal traveling mode. In the comfort traveling mode, for example, a setting process of making a change in the rotation of the internal combustion engine or the electric motor slow, setting the gear shift timing of the transmission as an earlier timing, making the steering wheel 82 light, and making the damper softer is performed such that the host vehicle M responds gently to the driver's driving operation, and a comfortable ride and quietness can be obtained in the host vehicle M. The traveling modes are not limited to those described above. In other words, various traveling modes may be implemented by changing and controlling settings of controllable components. The traveling mode may include, for example, the control (change) of activation of an air conditioning system such as an air conditioner. The traveling mode may be switched by the driver selecting one of prescribed traveling performance options or may be changed by the driver appropriately adjusting adjustable (changeable) properties.

The driving control determiner 180 determines on the driving mode of the host vehicle M as one of a plurality of driving modes with different tasks imposed on the driver. Further, the driving control determiner 180 determines a driver's motivation for driving (hereinafter referred to as the "driver's motivation") and determines on the presence or absence of execution and/or the degree of execution of the traveling control in the driving assistance in accordance with a level of the determined motivation of the driver. The degree of execution is, for example, an amount of intervention for intervening traveling control for the driving assistance. In other words, the driving control determiner 180 determines on the amount of intervention in which the traveling control for the driving assistance is allowed to intervene in the driving operation of the driver. More specifically, the driving control determiner 180 reduces the degree of execution of traveling control (reduces the amount of intervention) as the driver's motivation increases. Thereby, when the driver has a high motivation for driving, i.e., has a high sense of purpose in desiring to perform the driving operation of the host vehicle M, the driver can drive the host vehicle M according to his or her own sense of purpose. The degree of execution is not limited to the amount of intervention of traveling control. For example, the degree of execution may be associated with a process of changing a threshold value for executing traveling control to the side where it is easy to execute/difficult to execute the traveling control, a process of changing the strength (gain) of the traveling control, a process of changing the sharpness of a response when the traveling control is performed, and a process of changing a condition for starting the traveling control of the driving assistance such as a process of changing an upper limit value when the execution of the traveling control starts. The driver's motivation and/or the presence or absence of execution of the traveling control and/or the degree of execution of the traveling control in the driving assistance are used to generate the notification image to be described below.

The driving control determiner 180 determines the driver's motivation according to a combination of the gripping position and the number of grips included in the gripping state. The driving control determiner 180 determines that the driver's motivation increases as the number of grips increases. When the number of grips is the same, the driving control determiner 180 determines that the driver's motivation is higher when the gripping position is the right and/or left. The driving control determiner 180 reduces the amount of intervention of driving assistance as the determined motivation of the driver increases. That is, the driving control determiner 180 limits the execution of driving assistance or decreases the degree of execution as the determined motivation of the driver increases.

The driving control determiner 180 may further determine the driver's motivation by combining the gripping position and the number of grips with a driver's visual line direction. The driving control determiner 180 determines that the driver's motivation is high when the visual line direction of the driver is the front of the host vehicle M in the traveling direction. In addition to the front of the host vehicle M, visual line directions assumed to be the front of the host vehicle M in the traveling direction of the driver include a plurality of prescribed visual line directions in which it is assumed that the host vehicle M is being driven. More specifically, the visual line directions in front of the host vehicle M in the traveling direction include, for example, a visual line direction when a rearward situation outside of the vehicle is temporarily confirmed with a rearview mirror of the cabin, a side mirror outside of the vehicle, or the like, a visual line direction when a traveling state is temporarily confirmed with a speedometer indicating the traveling speed of the host vehicle M, a tachometer indicating the number of revolutions (a rotational speed) of the internal combustion engine provided in the host vehicle M, or the like in addition to a visual line direction when the front is confirmed through a front windshield such as a front window glass. The driving control determiner 180 may determine that the driver is facing the front when the visual line direction of the driver is any one of the above-described visual line directions. The driving control determiner 180 may reduce the amount of intervention of driving assistance when the visual line direction of the driver is the front.

The traveling mode controller 160 may determine on the traveling mode in accordance with the driver's motivation determined by the driving control determiner 180. In this case, the traveling mode controller 160 determines on a traveling mode in which the driver can perform a driving operation more suitable for the sense of purpose of the driving operation when the determined motivation of the driver becomes higher. For example, the traveling mode controller 160 determines on the traveling mode as the sport traveling mode when the driver's motivation is high and determines on the traveling mode as the comfort traveling mode when the driver's motivation is low.

The notification image generator 192 generates a notification image on the basis of the driver's gripping state of the steering wheel 82 recognized by the second recognizer 142, the driver's motivation determined by the driving control determiner 180, and the presence or absence of execution of the traveling control and/or the degree of execution of the traveling control in the driving assistance determined on by the driving control determiner 180. The notification image is an image for providing a notification of the gripping state, the driver's motivation, the degree of execution of driving assistance, and the like in a form in which it is easy for the driver to recognize visually them. The display processor 190 causes the display device 32 provided in the HMI 30 to display the notification image generated by the notification image generator 192.

Figure 3:
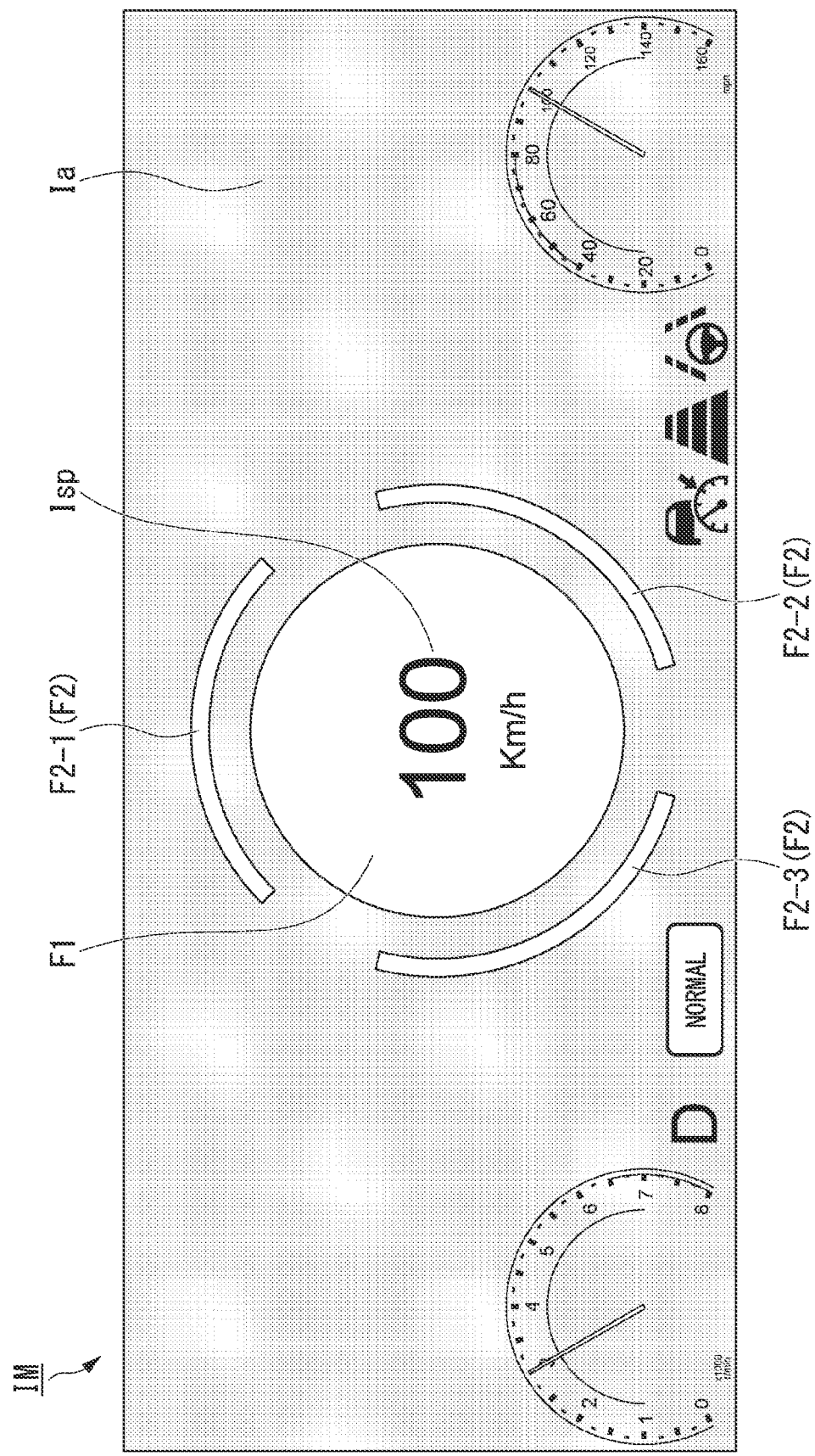
FIG. 3 is a diagram showing an example of a notification image.

FIG. 3 is a diagram showing an example of a notification image. In FIG. 3, the entire image display area of the display device 32 is assumed to be the entire image area Ia of the notification image IM and an example of the notification image IM in which information which is presented to the driver (or of which the driver is notified) is displayed together with information indicating a current traveling state of the host vehicle M such as a speedometer, a tachometer, shift position display ("D"=drive range in FIG. 3), traveling mode display ("NORMAL"=normal traveling mode in FIG. 3), an ACC icon, inter-vehicle distance setting display, and an LKAS icon is shown. The notification image IM is not limited to the display format shown in FIG. 3. For example, the notification image IM may be displayed in an area between the speedometer and the tachometer displayed at prescribed positions on the left and right in the entire image display area of the display device 32.

In the image area Ia, the notification image IM includes, for example, a first graphic F1 based on a circle and a second graphic F2 of a circular shape on the outer periphery of the first graphic F1 (outside of the circle in the radial direction). In FIG. 3, the first graphic F1 of a state in which traveling speed information Isp indicating the current traveling speed of the host vehicle M is displayed is shown and the second graphic F2 having three notches is shown. That is, the case where three arcs of a second graphic F2-1 on the upper side, a second graphic F2-2 on the right side, and a second graphic F2-3 on the left side form the second graphic F2 of the circular shape is shown in FIG. 3. The second graphic F2 may have a gradual change in brightness or color tone (a so-called gradation) instead of the notch. The notch (including the gradation) in the second graphic F2 does not necessarily have to be provided. In other words, the notch need not be provided in the second graphic F2. The second graphic F2-2 is an example of the "right area" and the second graphic F2-3 is an example of the "left area." Unless otherwise specified in the following description, the second graphic F2-1, the second graphic F2-2, and the second graphic F2-3 are not distinguished and the overall shape including the notch is assumed to be the circular shape of the second graphic F2.

The first graphic F1 indicates the gripping position and the number of grips of the steering wheel 82 associated with the driver and the level of the driver's motivation according to a shape thereof. The notification image generator 192 notifies the driver of the gripping position and the number of grips recognized by the second recognizer 142 by deforming the first graphic F1 such that the location of the first graphic F1 corresponding to a part of the steering wheel 82 gripped by the driver is expanded. The notification image generator 192 indicates a state in which the driver is gripping the left and right sides of the steering wheel 82 with both hands, for example, by expanding the right and left sides of the first graphic F1. The notification image generator 192 notifies the driver of the driver's motivation determined by the driving control determiner 180 by changing the size of the first graphic F1, i.e., by changing the length of the diameter of the circle. For example, the notification image generator 192 indicates that the driver's motivation is high by increasing the diameter and increasing an overall size of the first graphic F1 and indicates that the driver's motivation is low by decreasing the diameter and decreasing the overall size of the first graphic F1. The notification image generator 192 may notify the driver of the driver's motivation determined by the driving control determiner 180 by changing the color of the entire image area Ia of the notification image IM and the color of the first graphic F1. For example, the notification image generator 192 may indicate that the driver's motivation is high by setting the color of the image area Ia as a color that is easier for the driver to recognize in the field of view (for example, a color that tends to be red) even if the driver does not directly view the notification image IM and may indicate that the driver's motivation is low by setting the color of the image area Ia as a color for enabling the driver to relax more easily (for example, a color that tends to be blue). In this way, the notification image generator 192 visually notifies the driver of the gripping state of the steering wheel 82 or the level of the driver's motivation according to a combination of the shape of the first graphic F1, the size of the first graphic F1, and the color of the image area Ia or the first graphic F1 described above.

The second graphic F2 indicates the presence or absence of execution of the traveling control and the degree of execution of the traveling control according to its shape and a condition of separation from the first graphic F1. The notification image generator 192 notifies the driver of the degree of execution of the traveling control based on the driving assistance determined on by the driving control determiner 180 by changing a distance between the first graphic F1 and the circle of the second graphic F2, more specifically, a distance from the inner circle of the second graphic F2. The notification image generator 192 may notify the driver of the degree of execution of the traveling control based on the driving assistance by changing the thickness of the circle of the second graphic F2, more specifically, the difference between the length of the diameter of the inner circle and the length of the diameter of the outer circle. The notification image generator 192 may notify the driver of the degree of execution of the traveling control based on the driving assistance by changing the shade of the display of the circle of the second graphic F2 to make it easier or harder to view the second graphic F2. In other words, the notification image generator 192 may notify the driver of the degree of execution of the traveling control based on the driving assistance by changing the degree of definition of the second graphic F2. The notification image generator 192 notifies the driver of the presence or absence of the traveling control based on the driving assistance determined on by the driving control determiner 180 by switching a mode between a display mode and a non-display mode for the second graphic F2. The notification image generator 192 may notify the driver of the presence or absence of execution of the traveling control and/or the degree of execution of the traveling control in the driving assistance determined on by the driving control determiner 180 by changing the color of the second graphic F2 or blinking the second graphic F2. For example, the notification image generator 192 may indicate that the degree of execution of the traveling control based on the driving assistance is low by setting the color of the second graphic F2 as a color that is easier for the driver to recognize in the field of view (for example, a color that tends to be red) even if the driver does not directly view the notification image IM and may indicate that the degree of execution of the traveling control based on the driving assistance is high by setting the color of the second graphic F2 as a color for enabling the driver to relax more easily (for example, a color that tends to be blue). For example, the notification image generator 192 may indicate that the degree of execution of the traveling control based on the driving assistance is low by blinking the second graphic F2 and may indicate that the degree of execution of the traveling control based on the driving assistance is high by displaying (lighting up) the second graphic F2 all the time. In this way, the notification image generator 192 visually notifies the driver of the presence or absence of execution of the traveling control and/or the degree of execution of the traveling control in the driving assistance according to a combination of the shape of the second graphic F2, the distance between the first graphic F1 and the second graphic F2, the color of the second graphic F2, and the blinking or lighting-up of the second graphic F2 described above.

FIG. 4 is a diagram showing an example of corresponding relationships between driving modes, driving assistance, and traveling modes. In FIG. 4, an example of relationships between the driving modes controlled by the vehicle control device 100, the driver's motivation, the presence or absence of driving assistance or the degree of execution of the driving assistance, and the traveling modes is shown.

First, the driving modes will be described. For example, there are five modes from mode A to mode E as the driving modes of the host vehicle M. The degree of automation of the driving control of the host vehicle M in the driving modes is highest in mode A, lower in the order of mode B, mode C, and mode D, and lowest in mode E. In contrast, a task imposed on the driver is lightest in mode A, heavier in the order of mode B, mode C, and mode D, and heaviest in mode E. Because traveling control related to automated driving and driving assistance is not performed in mode E, the driving control determiner 180 is responsible for shifting the driving mode to driving by the driver (so-called manual driving) in control related to the decision of the driving mode. The content of the driving modes will be exemplified below.

In mode A, the state is a state in which a driving control level related to the automated driving is highest (hereinafter referred to as an "automated driving state") and neither forward monitoring nor gripping of the steering wheel 82 (a steering grip in FIG. 3) is imposed on the driver. However, even in mode A, the driver is required to be in a posture where the fast shift to manual driving is enabled in response to a request from the system centered on the automated driving controller 120 and the driving control determiner 180. The term "automated driving" as used herein indicates that both steering and acceleration/deceleration are controlled independently of the operation of the driver. The term "forward region or direction" indicates a space in a traveling direction of the host vehicle M that is visually recognized via the front windshield. Mode A is a driving mode in which the host vehicle M travels at a prescribed speed (for example, about 50 [km/h]) or less on a motorway such as an expressway and which can be executed when a condition in which there is a tracking target preceding vehicle or the like is satisfied. Mode A may be referred to as a traffic jam pilot (TJP). When this condition is no longer satisfied, the driving control determiner 180 changes the driving mode of the host vehicle M to mode B.

In mode B, a driving control level related to the automated driving is lower than that of mode A and a task of monitoring a forward direction of the host vehicle M (hereinafter referred to as forward monitoring) is imposed on the driver, but a task of gripping the steering wheel 82 is not imposed on the driver. In mode C, a driving control level related to the automated driving is lower than that of mode B and a forward monitoring task and a task of gripping the steering wheel 82 are imposed on the driver. In mode D, a driving control level related to the automated driving is lower than that of mode C and a task in which a certain degree of driving operation is required for at least one of steering and acceleration/deceleration of the host vehicle M is imposed on the driver. In mode E, a driving control level related to the automated driving is lower than that of mode D and manual driving in which a task requiring a driving operation for both steering and acceleration/deceleration is imposed on the driver is performed. In mode E, a task of monitoring a forward direction of the host vehicle M is naturally imposed on the driver.

The automated driving controller 120 (more specifically, the ECU controller 126) executes an automated lane change corresponding to the driving mode determined on by the driving control determiner 180. Automated lane changes include an automated lane change (1) due to a system request and an automated lane change (2) due to a driver request. Examples of the automated lane change (1) include an automated lane change for passing and an automated lane change for traveling toward a destination (an automated lane change based on a change in a recommended lane) performed when the speed of the preceding vehicle is less than the speed of the host vehicle by a reference level or higher. In the automated lane change (2), if a condition related to speed, a positional relationship with a nearby vehicle, or the like is satisfied, the host vehicle M is allowed to change the lane in an operation direction when the direction indicator has been operated by the driver.

The automated driving controller 120 does not execute either of the automated lane changes (1) and (2) in mode A. The automated driving controller 120 executes both automated lane changes (1) and (2) in modes B and C. The automated driving controller 120 does not execute the automated lane change (1) but executes the automated lane change (2) in mode D. In mode E, neither of the automated lane changes (1) and (2) is executed by the automated driving controller 120.

The driving control determiner 180 changes the driving mode of the host vehicle M to a driving mode in which the task is heavier when the task related to the determined driving mode (hereinafter, the present driving mode) is not executed by the driver. Thus, the driving control determiner 180 monitors the driver's state for changing the driving mode and determines whether or not the driver's state is a state corresponding to the task. For example, the driving control determiner 180 determines whether or not the driver is in a posture where he/she cannot shift the driving to manual driving in response to a request from the system on the basis of a posture of the driver recognized by the second recognizer 142. The driving control determiner 180 determines whether or not the driver is performing forward monitoring on the basis of a visual line direction recognized by the second recognizer 142. The driving control determiner 180 performs various types of processes for changing the driving mode. For example, the driving control determiner 180 instructs the automated driving controller 120 (more specifically, the action plan generator 124) to generate a target trajectory for stopping the vehicle at the road shoulder or instructs the automated driving controller 120 to control the HMI 30 such that the driver is prompted to perform an action.

For example, in mode A, when the driver is in a posture where he/she cannot shift the driving to manual driving in response to a request from the system (for example, when he/she continues to look outside an allowable area or when a sign that driving is difficult is detected), the driving control determiner 180 performs a control process of changing the driving mode of the host vehicle M to mode B or lower and instructing the automated driving controller 120 to prompt the driver to shift the driving to manual driving using the HMI 30 and generate a target trajectory for causing the host vehicle M to gradually stop close to the road shoulder when the driver does not respond and stopping the automated driving. After the automated driving is stopped, the driving control determiner 180 changes the driving mode of the host vehicle M to mode D or E. Thereby, the host vehicle M can be started according to the manual driving of the driver. Hereinafter, the same is true for "stopping of automated driving." When the driver is not performing forward monitoring in mode B, the driving control determiner 180 performs a control process of changing the driving mode of the host vehicle M to mode C or lower and instructing the automated driving controller 120 to prompt the driver to perform the forward monitoring using the HMI 30 and generate a target trajectory for causing the host vehicle M to gradually stop close to the road shoulder when the driver does not respond and stopping the automated driving. When the driver is not performing forward monitoring or is not gripping the steering wheel 82 in mode C, the driving control determiner 180 performs a control process of changing the driving mode of the host vehicle M to mode D or lower and instructing the automated driving controller 120 to prompt the driver to perform the forward monitoring and/or grip the steering wheel 82 using the HMI 30 and generate a target trajectory for causing the host vehicle M to gradually stop close to the road shoulder when the driver does not respond and stopping the automated driving.

Next, the driving assistance will be described. The driver is expected to change a gripping position and the number of grips on the steering wheel 82 according to his or her motivation level for driving. In FIG. 4, an example of the gripping state of the steering wheel 82 according to the motivation level of the driver is schematically shown. The driver's motivation is also considered to be associated with the driving mode of the host vehicle M. For example, it is considered that motivation is highest in mode E, lower in the order of mode D, mode C, and mode B, and lowest in mode A. Thus, because the driving control determiner 180 does not perform driving assistance on the assumption that the driver does not desire driving assistance in mode E corresponding to manual driving and the level of driving control associated with automated driving is highest in mode A, driving assistance is not performed by the driving assistance controller 140 on the assumption that the driving control is performed by the automated driving controller 120. The driving control determiner 180 determines the motivation of the driver in modes B to D and determines on the degree of execution of traveling control based on driving assistance in accordance with a level of the determined motivation of the driver.

As described above, the driving control determiner 180 determines the driver's motivation according to a combination of the gripping position and the number of grips and determines on the degree of execution of traveling control based on driving assistance in accordance with the level of the determined motivation of the driver. The driving assistance includes, for example, longitudinal system assistance and lateral system assistance. The longitudinal system assistance is driving assistance for performing traveling control in the traveling direction of the host vehicle M and the lateral system assistance is driving assistance for performing traveling control in the vehicle width direction of the host vehicle M. The driving control determiner 180 changes (sets) the amount of intervention for each type of driving assistance. In FIG. 4, an example of longitudinal system assistance and lateral system assistance that are executed in accordance with the level of the determined motivation of the driver is schematically shown. In FIG. 4, an example of an amount of intervention in the lateral system assistance is schematically shown.

In the longitudinal system assistance, the driving control determiner 180 changes, for example, the degree of execution of ACC. However, in the longitudinal system assistance, the driving control determiner 180 makes a change in accordance with the level of the motivation of the driver using the inter-vehicle distance from the preceding vehicle as an amount of intervention without allowing a process of following the preceding vehicle traveling in front of the host vehicle M in an ACC process. More specifically, the driving control determiner 180 changes the inter-vehicle distance to a shorter distance because the driver himself/herself can recognize the preceding vehicle when the driver's motivation is high and changes the inter-vehicle distance to a longer distance because the driver himself/herself is unlikely to recognize the preceding vehicle when the driver's motivation is low. Thereby, the vehicle control device 100 can control the brake device 210 at an earlier stage especially when the host vehicle M approaches the preceding vehicle in a state in which the driver's motivation is low. The driving control determiner 180 performs a process of setting ACC (setting the inter-vehicle distance) like a process of setting ACC in mode A when the driver's motivation is low in the longitudinal system assistance. Thereby, the vehicle control device 100 can eliminate the difference in the behavior of the host vehicle M in switching between mode A and the ACC driving assistance executed in the most recent mode B, i.e., can seamlessly switch the driving mode.

In the lateral system assistance, for example, the driving control determiner 180 changes degrees of execution of LKAS and RDM. More specifically, when the driver's motivation is high, the driving control determiner 180 makes a change for preventing LKAS from being executed (limits the execution of LKAS) and makes a change for executing only RDM such that the driver himself/herself can travel at any position in the vehicle width direction within the traveling lane. On the other hand, when the driver's motivation is low, the driving control determiner 180 makes a change for executing LKAS and RDM such that the vehicle is allowed to travel in the center of the traveling lane as a reference. At this time, the driving control determiner 180 changes a range (a threshold value) of the distance in the vehicle width direction in LKAS according to the level of the driver's motivation. In other words, the driving control determiner 180 changes an amount of intervention in which LKAS intervenes in the lateral system assistance according to the level of the driver's motivation. More specifically, the driving control determiner 180 shortens the distance in the vehicle width direction in which traveling is possible (i.e., narrows the width: threshold value="small") such that the vehicle is allowed to travel more centrally in the traveling lane when the driver's motivation is low and lengthens the distance in the vehicle width direction in which traveling is possible (i.e., widens the width: threshold value="large") such that the vehicle is allowed to travel within a certain range from the center of the traveling lane when the driver's motivation is high. More specifically, the amount of intervention in which LKAS intervenes in the driver's driving operation increases when the driver's motivation is low and decreases when the driver's motivation is high. Thereby, when the driver's motivation increases to some extent, the driver can drive the vehicle at any position within the range of distance in the vehicle width direction based on the threshold value. The driving control determiner 180 performs a process of setting LKAS and RDM in the case of a low motivation of the driver like a process of setting LKAS and RDM in mode A even in the lateral system assistance. Thereby, the vehicle control device 100 can seamlessly switch between mode A and driving assistance of LKAS and RDM executed in the most recent mode B, even in traveling control of the host vehicle M in the vehicle width direction.

The driving assistance controller 140 (more specifically, the driving assistance executor 144) executes traveling control corresponding to the driving assistance (i.e., the longitudinal system assistance, the lateral system assistance, and the amount of intervention) determined on by the driving control determiner 180. When the traveling state of the host vehicle M deviates or is likely to deviate from the range of driving assistance being executed, the driving assistance controller 140 may be configured to control the HMI 30 for prompting the driver to perform a driving operation such that a caution or a warning is given. The driving control determiner 180 may be configured to issue an instruction for giving the caution or the warning to the driver.

Next, the traveling mode will be described. The driving control determiner 180 allows the driver to change the traveling mode in mode E, which is manual driving, and determines on the traveling mode as the comfort traveling mode in mode A. In modes B to D, the driving control determiner 180 determines on the traveling mode in accordance with the level of the determined motivation of the driver.

As described above, the driving control determiner 180 determines on the traveling mode as the sport traveling mode when the driver's motivation is high and determines on the traveling mode as the comfort traveling mode when the driver's motivation is low. In FIG. 4, an example of the traveling mode determined on in accordance with the level of the determined motivation of the driver and an example of the behavior (response and feedback) of the steering wheel 82 during driving in the traveling mode are schematically shown.

The traveling mode controller 160 executes control for changing various properties related to traveling of the host vehicle M such that the traveling mode determined on by the driving control determiner 180 is achieved. Thereby, the response and feedback of the steering wheel 82 while the host vehicle M is traveling increase in the sport traveling mode and decrease in the comfort traveling mode. Even if the host vehicle M is traveling in the traveling mode determined on and changed by the driving control determiner 180 in accordance with the driver's motivation, the driver can change the traveling mode. Thereby, the vehicle control device 100 can cause the host vehicle M to travel in a traveling mode that matches the driver's motivation and the driver's desires.

[Example of Method of Determining Driver's Motivation]

Figure 5:
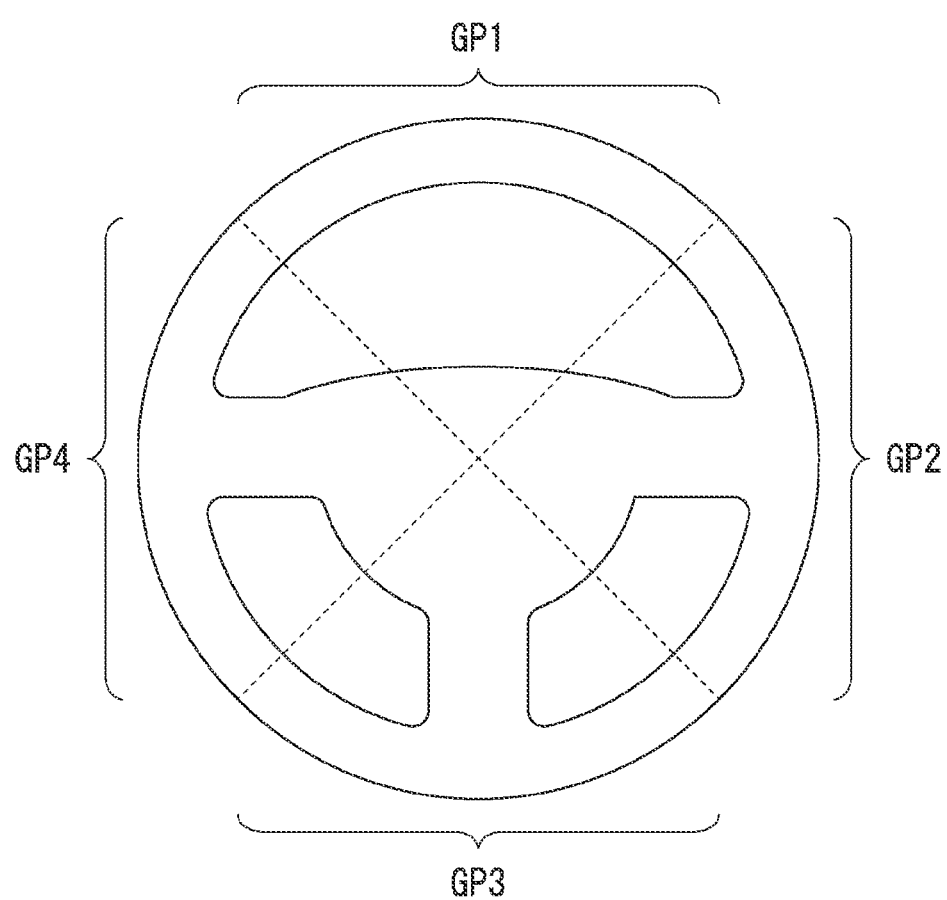
FIG. 5 is a diagram showing an example of a configuration in which a gripping state of a steering wheel is recognized from a driver.

FIG. 5 is a diagram showing an example of a configuration in which the gripping state of the steering wheel 82 by the driver is recognized. In FIG. 5, an example of a configuration in which the driver's gripping position is recognized by dividing the steering wheel 82 into four parts when the steering wheel 82 has an annular shape is shown. The second recognizer 142 detects whether or not the driver is gripping each of a first gripping part GP1 in an upper region of the steering wheel 82, a second gripping part GP2 in a right region thereof, a third gripping part GP3 in a lower region thereof, and a fourth gripping part GP4 in a left region thereof on the basis of a signal input from the steering grip sensor 84 attached to the steering wheel 82. Further, the second recognizer 142 detects whether the number of parts gripped by the driver is one or two. The second recognizer 142 recognizes the gripping position and the number of grips on the basis of a detection result. The second recognizer 142 outputs information about a gripping state including the recognized gripping position and the recognized number of grips to each of the driving control determiner 180 and the display processor 190.

FIG. 6 is a diagram showing an example of determination patterns for determining the driver's motivation. In FIG. 6, an example in which the driving control determiner 180 determines the driver's motivation as one of seven levels, for example, from level 1 to level 7, is shown. In relation to the level of the driver's motivation, level 1 is lowest, level 2, level 3, level 4, level 5, and level 6 are higher in that order, and level 7 is highest. In FIG. 6, the position (a gripping position) where the driver grips the steering wheel 82 is schematically shown. The driving control determiner 180 determines the motivation of the driver when the execution of the driving assistance in the vehicle control device 100 is effective (the ADAS function is turned "on") and the driving mode is one of modes B to D.

When the driver has turned "off" the ADAS function, the driving control determiner 180 sets the driving mode as mode E that is manual driving and determines that the driver's motivation is level 7 regardless of the gripping state of the steering wheel 82 associated with the driver or a visual line direction of the driver. Level 7 is a level at which it can be determined that the driver is in a state in which a safety function or driving assistance based on the ADAS function is not desired because the motivation is high.

The driving control determiner 180 determines that the motivation of the driver is level 6 when the gripping state recognized by the second recognizer 142 is associated with the presence or absence of gripping="presence," the number of grips="2," the gripping position="right and left regions (the second gripping part GP2 and the fourth gripping part GP4 shown in FIG. 5)," and the visual line direction="front." That is, the driving control determiner 180 determines that the level is level 6 when it is recognized that the driver is facing the front and gripping the left and right regions of the steering wheel 82 with both hands. Level 6 is, for example, a level at which it can be determined that the driver himself/herself is in an optimal posture capable of coping with all situations in traveling of the host vehicle M in a state in which the driver is enjoying driving the host vehicle M, a state in which the driver is seeking a sense of unity with the host vehicle M, or the like.

The driving control determiner 180 determines that the motivation of the driver is level 5 when the gripping state recognized by the second recognizer 142 is associated with the presence or absence of gripping="presence," the number of grips="2," the gripping position="upper and/or lower regions (the first gripping part GP1 and/or the third gripping part GP3 shown in FIG. 5)," and the visual line direction="front." That is, the driving control determiner 180 determines that the level is level 5 when it is recognized that the driver is facing the front and gripping the upper and/or lower regions of the steering wheel 82 with both hands of the driver. Level 5 is, for example, a level at which it can be determined that reliable traveling is desired instead of unreasonable driving in a state in which the driver prefers to drive the host vehicle M, but does not desire a sense of unity with the host vehicle M or the like.

The driving control determiner 180 determines that the motivation of the driver is level 4 when the gripping state recognized by the second recognizer 142 is associated with the presence or absence of gripping="presence," the number of grips="1," the gripping position="right or left region (the second gripping part GP2 or the fourth gripping part GP4 shown in FIG. 5)," and the visual line direction="front." That is, the driving control determiner 180 determines that the level is level 4 when it is recognized that the driver is facing the front and gripping the right or left region of the steering wheel 82 with one hand. Level 4 is, for example, a level at which it can be determined that the driver is in a posture in which the state can return to a state in which the driving operation can be performed quickly (for example, a state in which it is determined that the level is level 5 or 6) due to a traveling state of the host vehicle M in a state in which the driver is slightly relaxed and one hand not used in gripping is placed on the shift lever or the like.

The driving control determiner 180 determines that the motivation of the driver is level 3 when the gripping state recognized by the second recognizer 142 is associated with the presence or absence of gripping="presence," the number of grips="1," the gripping position="upper or lower region (the first gripping part GP1 or the third gripping part GP3 shown in FIG. 5)," and the visual line direction="front." That is, the driving control determiner 180 determines that the level is level 3 when it is recognized that the driver is facing the front and gripping the upper or lower region of the steering wheel 82 with one hand of the driver. Level 3 is, for example, a level at which it can be determined that the driver is enjoying information provided by an entertainment device or the like provided in the host vehicle M along with driving of the host vehicle M in a state in which the driver is relaxed or is continuing simple driving for a long time or the like.

The driving control determiner 180 determines that the motivation of the driver is level 2 when the gripping state recognized by the second recognizer 142 is associated with the presence or absence of gripping="absence," the number of grips="0," the gripping position="absence," and the visual line direction="front." That is, the driving control determiner 180 determines that the level is level 2 when it is recognized that the driver is facing the front, but is not gripping the steering wheel 82. Level 2 is, for example, a level at which it can be determined that the driver is not gripping the steering wheel 82, i.e., is in a so-called hands-off state, and is in a state in which the physical load is released, but the driver is in a posture in which the state can return to a state in which the driving operation can be performed quickly (a state in which it is determined that the level is level 5 or 6) due to a traveling state of the host vehicle M.

When the driving mode is mode A, i.e., when the level of driving control related to automated driving is highest, the driving control determiner 180 determines that the driver's motivation is level 1 regardless of the driver's gripping state of the steering wheel 82 and the driver's visual line direction. Level 1 is, for example, a level at which it can be determined that the state is a state in which the driver abandons the task of the driving operation temporarily such as a state in which the driver looks away to operate an entertainment device provided in the host vehicle M or a state in which the driver abandons the task of the driving operation for a long time (here, a posture in which the driving is shifted to manual driving quickly in response to a request from the system) by switching the driving control to the driving control of the automated driving in the host vehicle M.

Thus, the driving control determiner 180 determines the driver's current motivation on the basis of the gripping state of the steering wheel 82 and the visual line direction of the driver recognized by the second recognizer 142. Although a combination of several gripping parts as gripping parts of the steering wheel 82 for each motivation of the driver is shown in FIG. 6, the gripping part of the steering wheel 82 when the driver drives the host vehicle M is not limited to a combination of gripping parts shown in FIG. 6. For example, it is also conceived that the driver grips each of the first gripping part GP1 and the second gripping part GP2 or grips each of the third gripping part GP3 and the fourth gripping part GP4. In this case, the driving control determiner 180 may determine the motivation of the driver in correspondence with any combination of the gripping parts shown in FIG. 6. For example, when the driver is gripping each of the first gripping part GP1 and the second gripping part GP2, the driving control determiner 180 may determine that the driver's motivation is level 6 because one hand of the driver is gripping the second gripping part GP2 and may determine that the driver's motivation is level 5 because one hand of the driver is gripping the first gripping part GP1.

[Example of Notification Image for Each Driver's Motivation]

FIG. 7 is a diagram showing an example of the notification image IM corresponding to the driver's motivation. As described above, the display processor 190 (more specifically, the notification image generator 192) changes the color of the entire image area Ia of the notification image IM or the first graphic F1 or deforms the first graphic F1 such that the driver is notified of the gripping position and the number of grips recognized by the second recognizer 142 and the driver's motivation determined by the driving control determiner 180. In FIG. 7, an example of the notification image IM generated by the notification image generator 192 for each driver's motivation determined by the driving control determiner 180 is shown. In FIG. 7, only the image area Ia of the notification image IM and the first graphic F1 included in the image area Ia are shown.

When the driver's motivation is level 7, the notification image generator 192 changes the color of the image area Ia to, for example, "black," such that a notification of manual driving is provided. The notification image generator 192 does not display the circle of the first graphic F1 within the image area Ia. In the notification image IM of level 7 shown in FIG. 7, a state in which the traveling speed information Isp is displayed at the position where the circle of the first graphic F1 is displayed is shown.

When the driver's motivation is level 6, the notification image generator 192 changes the color of the image area Ia to, for example, "red" that is easily recognized by the driver during driving, and maximizes the size of the first graphic F1 such that a notification indicating that the driver's motivation is highest is provided. In other words, the notification image generator 192 maximizes the diameter of the circle of the first graphic F1. As shown in FIG. 7, the notification image generator 192 may also change the color of the first graphic F1 to a color similar to that of the image area Ia. The color of the first graphic F1 is similar to those of other levels. The notification image generator 192 deforms the first graphic F1 such that two locations of the right side and the left side corresponding to parts in which the driver is gripping the steering wheel 82 are expanded in the first graphic F1 to provide a notification indicating that positions where the driver is gripping the steering wheel 82 are "left and right positions (the second gripping part GP2 and the fourth gripping part GP4 shown in FIG. 5)." Even in the notification image IM of level 6 shown in FIG. 7, a state in which the traveling speed information Isp is displayed within the first graphic F1 is shown. The display of the traveling speed information Isp within the first graphic F1 is similar to those of other levels. The length of the diameter of the circle of the first graphic F1 at level 6 is an example of a "first length."

When the driver's motivation is level 5, the notification image generator 192 changes the color of the image area Ia to, for example, "light brown" that is easily recognized by the driver during driving, and makes the size of the first graphic F1 smaller than that of level 6 such that a notification indicating that the driver's motivation is high is provided. In other words, the notification image generator 192 makes the diameter of the circle of the first graphic F1 shorter than the diameter of the circle of level 6. The notification image generator 192 deforms the first graphic F1 such that two locations of the upper side and/or the lower side corresponding to parts in which the driver is gripping the steering wheel 82 are expanded in the first graphic F1 to provide a notification indicating that positions where the driver is gripping the steering wheel 82 are "upper and lower positions (the first gripping part GP1 and/or the third gripping part GP3 shown in FIG. 5)." In the notification image IM of level 5 shown in FIG. 7, an example of the first graphic F1 deformed to expand the upper side is shown. The length of the diameter of the circle of the first graphic F1 at level 5 is an example of a "second length."

When the driver's motivation is level 4, the notification image generator 192 changes the color of the image area Ia to, for example, "dark blue," and makes the size of the first graphic F1 smaller than that of level 5 such that a notification indicating that the driver's motivation is normal (neither high nor low) but is slightly high is provided. That is, the diameter of the circle of the first graphic F1 is made shorter than the diameter of the circle of level 5. The notification image generator 192 deforms the first graphic F1 such that the location of the right side or the left side corresponding to a part in which the driver is gripping the steering wheel 82 is expanded in the first graphic F1 to provide a notification indicating that a position where the driver is gripping the steering wheel 82 is a "right or left position (the second gripping part GP2 or the fourth gripping part GP4 shown in FIG. 5)." In the notification image IM of level 4 shown in FIG. 7, an example of the first graphic F1 deformed such that the right side is expanded is shown. The length of the diameter of the circle of the first graphic F1 at level 4 is an example of a "third length."

When the driver's motivation is level 3, the notification image generator 192 changes the color of the image area Ia to, for example, "blue" for enabling the driver to relax easily, and makes the size of the first graphic F1 smaller than that of level 4 such that a notification indicating that the driver's motivation is normal but is slightly low is provided. That is, the diameter of the circle of the first graphic F1 is made shorter than the diameter of the circle of level 4. The notification image generator 192 deforms the first graphic F1 such that the location of the upper side or the lower side corresponding to a part in which the driver is gripping the steering wheel 82 is expanded in the first graphic F1 to provide a notification indicating that a position where the driver is gripping the steering wheel 82 is an "upper or lower position (the first gripping part GP1 or the third gripping part GP3 shown in FIG. 5)." In the notification image IM of level 3 shown in FIG. 7, an example of the first graphic F1 deformed to expand the lower side is shown. The length of the diameter of the circle of the first graphic F1 at level 3 is an example of a "fourth length."

When the driver's motivation is level 2, the notification image generator 192 changes the color of the image area Ia to, for example, "light blue" for enabling the driver to relax more easily, and makes the size of the first graphic F1 smaller than that of level 3 such that a notification indicating that the driver's motivation is low is provided. In other words, the notification image generator 192 makes the diameter of the circle of the first graphic F1 smaller than the diameter of the circle of level 3. Because the driver is not gripping the steering wheel 82 at level 2, the notification image generator 192 does not deform the circle of the first graphic F1 for a notification of this fact. In the notification image IM of level 2 shown in FIG. 7, an example of the first graphic F1 which is not deformed and remains as a circle is shown. The length of the diameter of the circle of the first graphic F1 at level 2 is an example of a "fifth length."

When the driver's motivation is level 1, the notification image generator 192 changes the color of the image area Ia to, for example, "gray," such that a notification indicating that driving control for automated driving is being executed in the host vehicle M is provided. As in the case of level 2, the notification image generator 192 does not deform the circle of the first graphic F1 such that a notification indicating that the driver is not gripping the steering wheel 82 is provided. Even at level 1, the diameter of the circle of the first graphic F1 is the same as the diameter of the circle at level 2. In the notification image IM of level 1 shown in FIG. 7, instead of the traveling speed information Isp displayed within the first graphic F1 at levels 7 to 2, a state in which text information of "AUTOMATED DRIVE" indicating that driving control for automated driving is being executed is shown.

In this way, the notification image generator 192 notifies the driver of the level of the determined motivation of the driver or the recognized gripping state of the steering wheel 82 associated with the driver in a visually recognizable form according to a combination of the color of the image area Ia and the color, the shape, the size, or the like of the first graphic F1. More specifically, the notification image generator 192 changes the color of the image area Ia (which may include the first graphic F1) to a color that is more easily recognized by the driver as the driver's motivation increases. Furthermore, the notification image generator 192 increases the size of the first graphic F1 as the driver's motivation increases. The notification image generator 192 indicates the driver's gripping position of the steering wheel 82 by deforming the shape of the first graphic F1.

[Method of Determining on Degree of Execution of Driving Assistance and Examples of Notification Images for Each Degree of Execution]

Figure 8:
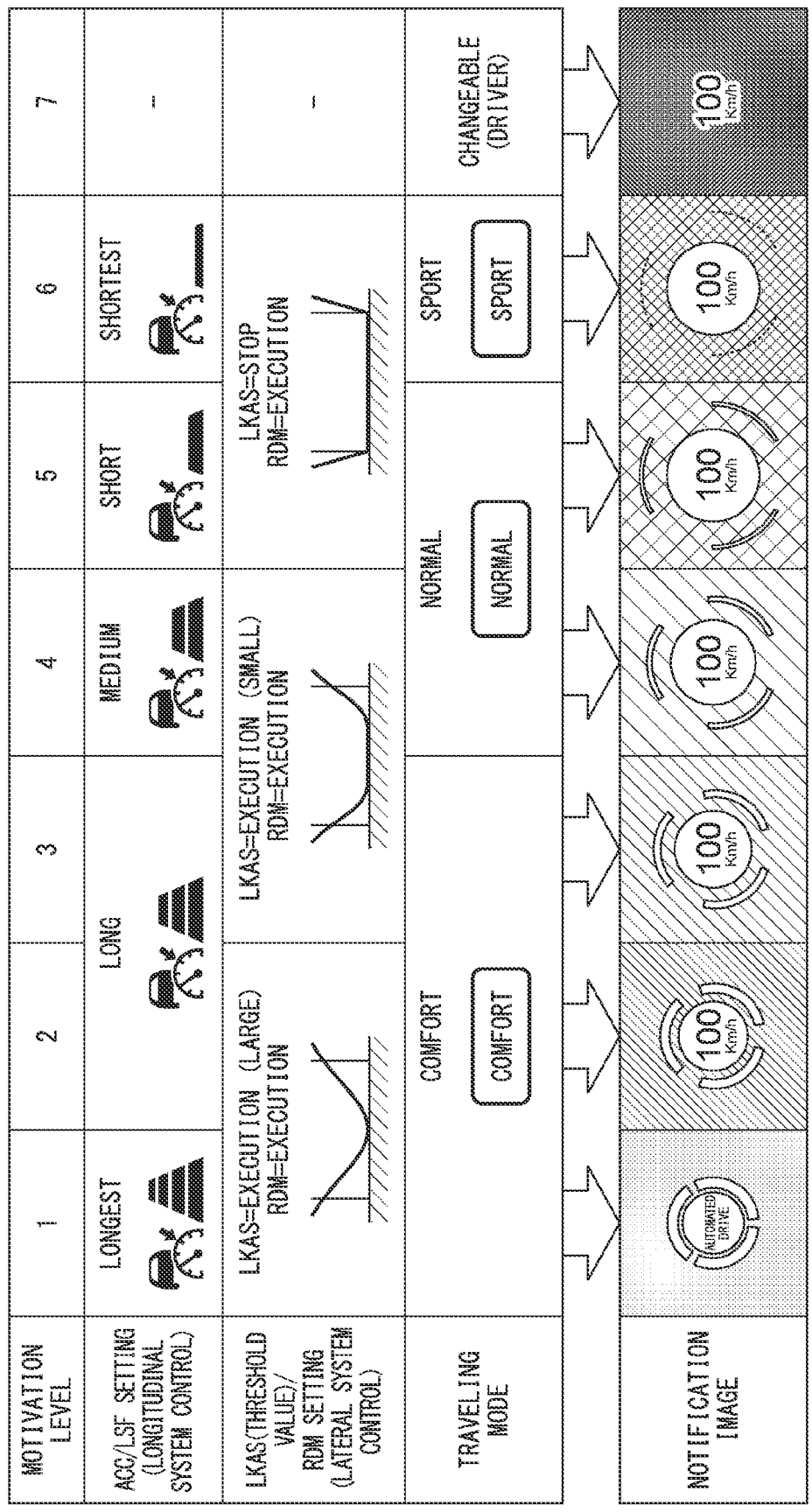
FIG. 8 is a diagram showing an example of degrees of execution of driving assistance and notification images corresponding to driver's motivations.

FIG. 8 is a diagram showing an example of the degree of execution of driving assistance and a notification image corresponding to the driver's motivation. In FIG. 8, an example in which the driving control determiner 180 changes (sets) the degree of execution of driving assistance (an amount of intervention of traveling control of driving assistance) and the traveling mode for each of the determined motivations of the driver is shown. More specifically, in FIG. 8, an example in which amounts of intervention of ACC and LSF as the longitudinal system assistance are set, amounts of intervention of LKAS and RDM as the lateral system assistance are set, and the traveling mode is changed is shown. In FIG. 8, an example of a notification image for notifying the driver that ACC and LSF are being executed is shown. The notification image may be displayed together with the notification image IM on the display device 32, for example, as shown in FIG. 3. In FIG. 8, an example of a state in which the travelable distance (range) in the vehicle width direction is limited by LKAS and RDM is schematically shown. In FIG. 8, an example of a notification image for notifying the driver of the set traveling mode is shown. Furthermore, in FIG. 8, an example of the notification image IM according to the degree of execution of the driving assistance (the amount of intervention of the traveling control for the driving assistance) is shown. In FIG. 8, an example of the notification image IM in which the first graphic F1 included within the image area Ia of the notification image IM is assumed not to be deformed (i.e., is assumed to remain as a circle) and attention is paid to a part of the second graphic F2 included within the image area Ia is shown.

When the driving control determiner 180 determines that the driver's motivation is level 7, the degree of execution of driving assistance is not changed because the ADAS function is turned "off" by the driver. In other words, the amounts of intervention of ACC, LSF, LKAS, and RDM are not set. The driving control determiner 180 enables the traveling mode to be changed by the driver. When the driver's motivation is level 7, the notification image generator 192 does not display the circle of the second graphic F2 within the image area Ia such that a notification indicating that the traveling control based on the driving assistance is not executed is provided.

When it is determined that the driver's motivation is level 6, the driving control determiner 180 sets the degree of execution of driving assistance as a lowest degree. More specifically, the driving control determiner 180 sets the inter-vehicle distance from the preceding vehicle as the amounts of intervention of ACC and LSF as a shortest distance ("shortest"). The driving control determiner 180 sets LKAS such that LKAS is not executed (or is stopped) and sets RDM to be executed. In other words, the driving control determiner 180 performs a setting process such that only RDM is executed as the lateral system assistance. The driving control determiner 180 changes the traveling mode to the sport traveling mode. When the driver's motivation is level 6, the notification image generator 192 increases a distance between the first graphic F1 and the second graphic F2 and makes the circle of the second graphic F2 thin such that a notification indicating that the traveling control based on the driving assistance is executed, but the degree of execution is low (the amount of intervention is small) is provided. That is, the notification image generator 192 increases the difference between the length of the diameter of the circle of the first graphic F1 and the length of the diameter of the inner circle of the second graphic F2 and decreases the difference between the length of the diameter of the inner circle of the second graphic F2 and the length of the diameter of the outer circle. Furthermore, the notification image generator 192 lowers the degree of definition of the second graphic F2, i.e., makes the display of the circle of the second graphic F2 lighter and less visible.

When it is determined that the driver's motivation is level 5, the driving control determiner 180 sets the degree of execution of driving assistance as a higher degree than when the driver's motivation is level 6. More specifically, the driving control determiner 180 sets the inter-vehicle distance from the preceding vehicle in ACC and LSF as a short distance ("short"). The driving control determiner 180 stops LKAS and sets only RDM to be executed as in the case where the driver's motivation is level 6. The driving control determiner 180 changes the traveling mode to the normal traveling mode. When the driver's motivation is level 5, the notification image generator 192 increases a distance between the first graphic F1 and the second graphic F2 and makes the circle of the second graphic F2 thin as in the case where the driver's motivation is level 6 such that a notification indicating that the degree of execution of traveling control based on driving assistance is low (the amount of intervention is small), but is not as low as (is not as small as) that when the driver's motivation is level 6 is provided. However, the notification image generator 192 does not lower the degree of definition of the second graphic F2.

When it is determined that the driver's motivation is level 4, the driving control determiner 180 makes the degree of execution of driving assistance higher than when the driver's motivation is level 5. More specifically, the driving control determiner 180 sets the inter-vehicle distance from the preceding vehicle in ACC and LSF as a medium distance ("medium"). The driving control determiner 180 performs a setting process such that LKAS is executed with a reduced amount of intervention (the threshold value="small") thereof and sets RDM to be executed. In other words, the driving control determiner 180 performs a setting process such that the amount of intervention is small but both LKAS and RDM are executed as the lateral system assistance. The driving control determiner 180 changes the traveling mode to the normal traveling mode as in the case where the driver's motivation is level 5. When the driver's motivation is level 4, the notification image generator 192 makes the distance between the first graphic F1 and the second graphic F2 shorter than when the driver's motivation is level 5 and makes the circle of the second graphic F2 slightly thick such that a notification indicating that the degree of execution of traveling control based on the driving assistance is higher than when the driver's motivation is level 5 is provided. In other words, the notification image generator 192 makes the second graphic F2 close to the first graphic F1 and increases the difference between the length of the diameter of the inner circle and the length of the diameter of the outer circle of the second graphic F2 by decreasing the difference between the length of the diameter of the circle of the first graphic F1 and the length of the diameter of the inner circle of the second graphic F2 compared with the case where the driver's motivation is level 5.

When it is determined that the driver's motivation is level 3, the driving control determiner 180 makes the degree of execution of driving assistance higher than when the driver's motivation is level 4. More specifically, the driving control determiner 180 sets the inter-vehicle distance from the preceding vehicle in ACC and LSF as a long distance ("long"). The driving control determiner 180 sets LKAS such that LKAS is executed with the threshold value="small" and sets RDM to be executed as in the case where the driver's motivation is level 4. The driving control determiner 180 changes the traveling mode to the comfort traveling mode. When the driver's motivation is level 3, the notification image generator 192 makes the distance between the first graphic F1 and the second graphic F2 shorter than when the driver's motivation is level 4 and makes the circle of the second graphic F2 thicker such that a notification indicating that the degree of execution of traveling control based on the driving assistance is higher than when the driver's motivation is level 4 is provided. In other words, the notification image generator 192 makes the second graphic F2 closer to the first graphic F1 and further increases the difference between the length of the diameter of the inner circle and the length of the diameter of the outer circle of the second graphic F2 by decreasing the difference between the length of the diameter of the circle of the first graphic F1 and the length of the diameter of the inner circle of the second graphic F2 compared with the case where the driver's motivation is level 4.

When it is determined that the driver's motivation is level 2, the driving control determiner 180 makes the degree of execution of driving assistance higher than when the driver's motivation is level 3. More specifically, the driving control determiner 180 sets the inter-vehicle distance from the preceding vehicle in ACC and LSF as the inter-vehicle distance="long" as in the case where the driver's motivation is level 3. The driving control determiner 180 performs a setting process (the threshold value="large") such that LKAS is executed by increasing the amount of intervention of LKAS and sets the RDM to be executed. That is, the driving control determiner 180 performs a setting process such that both LKAS and RDM whose amounts of intervention are large are executed as lateral system assistance. The driving control determiner 180 may cause the degree of execution (the amount of intervention) of driving assistance when it is determined that the driver's motivation is level 2 to be the same as the degree of execution (the amount of intervention) of driving assistance when it is determined that the driver's motivation is level 3. The driving control determiner 180 changes the traveling mode to the comfort traveling mode as in the case where the driver's motivation is level 3. When the driver's motivation is level 2, the notification image generator 192 makes the distance between the first graphic F1 and the second graphic F2 shorter than when the driver's motivation is level 3 and makes the circle of the second graphic F2 thicker such that a notification indicating that the degree of execution of traveling control based on the driving assistance is higher than when the driver's motivation is level 3 is provided. In other words, the notification image generator 192 makes the second graphic F2 closer to the first graphic F1 and further increases the difference between the length of the diameter of the inner circle and the length of the diameter of the outer circle of the second graphic F2 by decreasing the difference between the length of the diameter of the circle of the first graphic F1 and the length of the diameter of the inner circle of the second graphic F2 compared with the case where the driver's motivation is level 3.

When it is determined that the driver's motivation is level 1, the driving control determiner 180 makes the degree of execution of driving assistance higher than when the driver's motivation is level 2 (or sets the degree of execution of driving assistance as a highest degree). That is, the driving control determiner 180 is in a state in which any driving control for driving assistance is not limited. More specifically, the driving control determiner 180 sets the inter-vehicle distance from the preceding vehicle in ACC and LSF as a longest distance ("longest"). The driving control determiner 180 sets LKAS such that LKAS is executed with the threshold value="large" and sets RDM to be executed as in the case where the driver's motivation is level 2. The driving control determiner 180 changes the traveling mode to the comfort traveling mode as in the case where the driver's motivation is level 3 or the driver's motivation is level 2. When the driver's motivation is level 1, the notification image generator 192 makes the distance between the first graphic F1 and the second graphic F2 shortest and makes the circle of the second graphic F2 thickest such that a notification indicating that the degree of execution of traveling control based on the driving assistance is highest is provided. In other words, the notification image generator 192 makes the second graphic F2 closest to the first graphic F1 and makes the difference between the length of the diameter of the inner circle and the length of the diameter of the outer circle of the second graphic F2 largest by decreasing the difference between the length of the diameter of the circle of the first graphic F1 and the length of the diameter of the inner circle of the second graphic F2 compared with the case where the driver's motivation is level 2.

In this way, the notification image generator 192 visually notifies the driver of the presence or absence of execution and/or the high degree of execution of the traveling control based on the driving assistance (the large amount of intervention of traveling control of driving assistance) that has been determined on according to a combination of the distance between the first graphic F1 and the second graphic F2, the thickness of the second graphic F2, and the like. More specifically, the notification image generator 192 changes the first graphic F1 and the second graphic F2 closer to each other as the degree of execution of driving assistance increases. Furthermore, the notification image generator 192 enables the second graphic F2 to be viewed easily by increasing the thickness of the second graphic F2 and increasing the degree of definition of the second graphic F2 (darkening the display of the circle of the second graphic F2) as the degree of execution of driving assistance increases.

[Example of Process of Determining Driver's Motivation]

Figure 9:
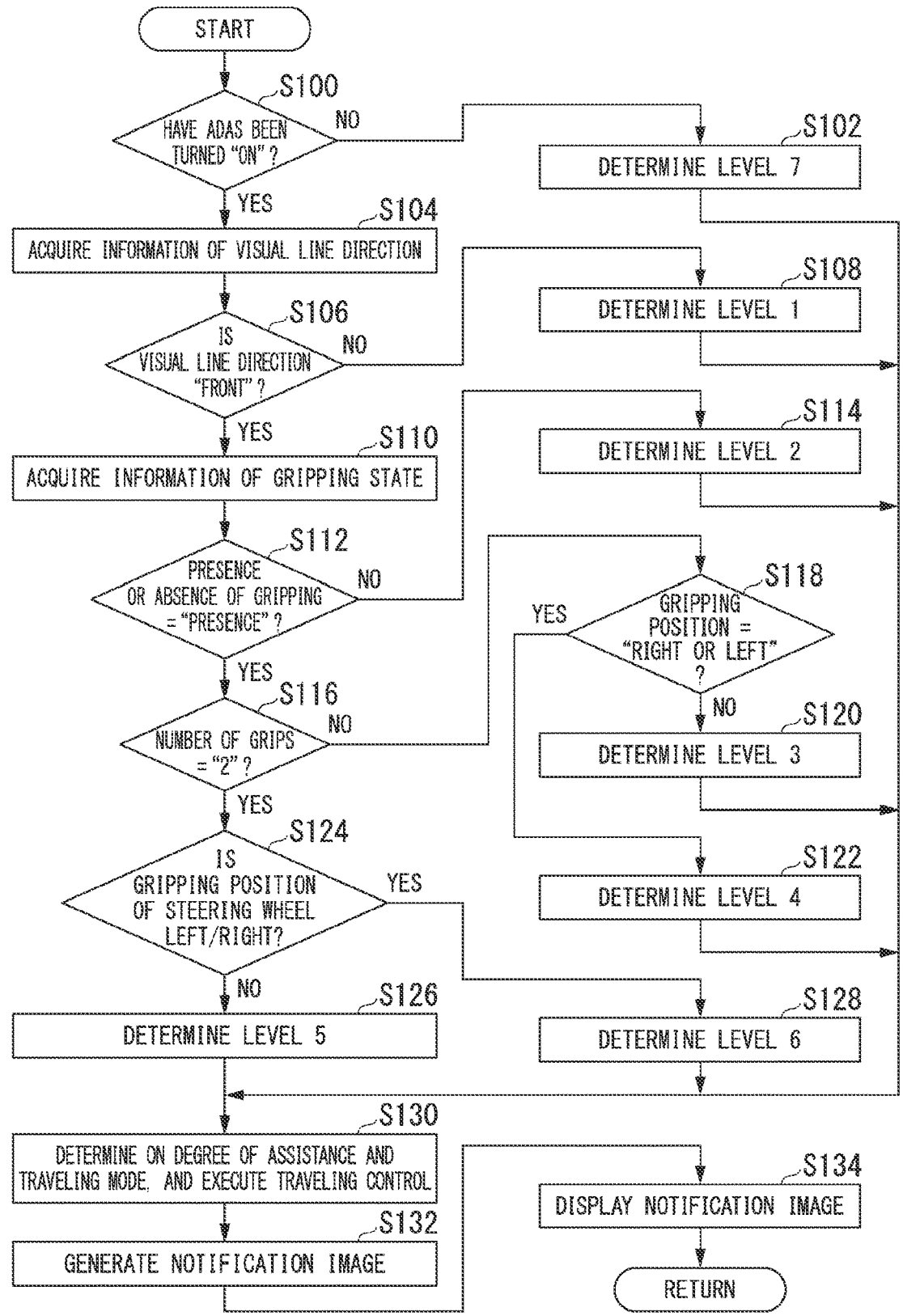
FIG. 9 is a flowchart showing an example of a flow of a process of determining the driver's motivation executed by a driving control determiner.

FIG. 9 is a flowchart showing an example of a flow of a process of determining the driver's motivation executed by the driving control determiner 180. The process of the present flowchart is iteratively executed, for example, while the vehicle control device 100 is operating. In the following description, it is assumed that the second recognizer 142 recognizes the driver's gripping state of the steering wheel 82 and the driver's visual line direction all the time.

First, the driving control determiner 180 determines whether or not ADAS have been turned "on" (step S100). When ADAS have not been turned "on" in step S100, i.e., when ADAS have been turned "off," the driving control determiner 180 determines that the driver's motivation is level 7 (step S102). Subsequently, the driving control determiner 180 moves the process to step S130.

On the other hand, when ADAS have been turned "on" in step S100, the driving control determiner 180 acquires information about the driver's visual line direction recognized by the second recognizer 142 (step S104). Subsequently, the driving control determiner 180 determines whether or not the visual line direction is the "front" (step S106). When the visual line direction is not the "front" in step S106, the driving control determiner 180 determines that the driver's motivation is level 1 if the driving mode is mode A (step S108). Subsequently, the driving control determiner 180 moves the process to step S130.

On the other hand, when the visual line direction is the "front" in step S106, the driving control determiner 180 acquires information about the driver's gripping state of the steering wheel 82 recognized by the second recognizer 142 (step S110). Subsequently, the driving control determiner 180 determines whether or not the presence or absence of gripping="presence" is satisfied in the acquired gripping state (step S112). When the presence or absence of gripping="presence" is not satisfied in step S112, the driving control determiner 180 determines that the driver's motivation is level 2 (step S114). Subsequently, the driving control determiner 180 moves the process to step S130.

On the other hand, when the presence or absence of gripping="presence" is satisfied in step S112, the driving control determiner 180 determines whether or not the number of grips="2" is satisfied in the acquired gripping state (step S116). When the number of grips="2" is not satisfied in step S116, the driving control determiner 180 determines whether or not the gripping position="right or left" is satisfied in the acquired gripping state (step S118). When the gripping position="right or left" is not satisfied in step S118, the driving control determiner 180 determines that the driver's motivation is level 3 (step S120). Subsequently, the driving control determiner 180 moves the process to step S130. When the gripping position="right or left" is satisfied in step S118, the driving control determiner 180 determines that the driver's motivation is level 4 (step S122). Subsequently, the driving control determiner 180 moves the process to step S130.

On the other hand, when the number of grips="2" is satisfied in step S116, the driving control determiner 180 determines whether or not the gripping position="left/right" is satisfied in the acquired gripping state (step S124). When it is determined that the gripping position="left/right" is not satisfied in step S124, the driving control determiner 180 determines that the driver's motivation is level 5 (step S126). Subsequently, the driving control determiner 180 moves the process to step S130. When the gripping position="right/left" is satisfied in step S124, the driving control determiner 180 determines that the driver's motivation is level 6 (step S128). Subsequently, the driving control determiner 180 moves the process to step S130.

Through this process, the driving control determiner 180 determines the driver's current motivation on the basis of the gripping state of the steering wheel 82 and the visual line direction of the driver recognized by the second recognizer 142.

Subsequently, the driving control determiner 180 determines on the degree of execution of driving assistance (the amount of intervention of traveling control of driving assistance) on the basis of a level of the determined motivation of the driver and determines on each function of driving assistance included in ADAS (ACC and LSF of the longitudinal system assistance and LKAS and RDM of the lateral system assistance in FIG. 8) and the traveling mode. The driving control determiner 180 sets the determined degree of assistance and the determined traveling mode in components for executing the functions. Thereby, the driving assistance executor 144 executes traveling control based on the driving assistance on the basis of the degree of assistance determined on by the driving control determiner 180 (step S130).

The notification image generator 192 generates a notification image IM on the basis of the driver's gripping state of the steering wheel 82 recognized by the second recognizer 142, the driver's motivation determined by the driving control determiner 180, and the presence or absence of traveling control and/or the degree of execution of the traveling control in the driving assistance determined on by the driving control determiner 180 (step S132). In other words, the notification image generator 192 generates the notification image IM indicating the traveling control based on the driving assistance executed by the driving assistance executor 144. The notification image generator 192 causes the display device 32 to display the generated notification image IM (step S134). Thereby, the driver can visually recognize the content of the traveling control of the driving assistance being executed in the host vehicle M from the notification image IM displayed on the display device 32.

The vehicle control device 100 returns the process to step S100.

Through this process, the driving control determiner 180 changes the driving assistance and the traveling mode of the host vehicle M to the suitable driving assistance and traveling mode corresponding to the determined current motivation of the driver. Thereby, the vehicle control device 100 can cause the host vehicle M to travel in accordance with the driver's motivation and appropriately provide driving assistance to the driver. Furthermore, the vehicle system 1 can notify the driver of the gripping state of the steering wheel 82 or the degree of execution of the traveling control based on driving assistance using the notification image IM displayed on the display device 32. Thereby, the driver can drive the host vehicle M after visually recognizing the current traveling state of the host vehicle M.

Meanwhile, it is also conceivable that the driver intentionally drives the host vehicle M while the host vehicle M is performing traveling control based on driving assistance. For example, it is also conceivable that the driving control determiner 180 determines that the driver's motivation is level 4 and the driver changes the traveling lane in which the host vehicle M is traveling by performing a steering operation on the steering wheel 82 when the host vehicle M is traveling in a state in which the driving assistance executor 144 is executing LKAS (threshold value="low") and RDM. The notification image generator 192 can also visually notify the driver of such a change in the traveling state of the host vehicle M.

FIG. 10 is a diagram showing an example of a notification image IM when a notification of a change in the traveling state of the host vehicle M is provided. In FIG. 10, it is assumed the notification image IM has the configuration shown in FIG. 3 (here, for example, information of a speedometer, a tachometer, or the like is not displayed within the image area Ia) and an example of a notification image IM (hereinafter referred to as a "notification image IM-1") when the driver performs the steering operation on the steering wheel 82 and hence is about to change the traveling lane of the host vehicle M to the right if the driver's motivation is level 4 is shown.

When the driver's motivation is level 4, the driving assistance executor 144 executes traveling control of driving assistance based on LKAS and RDM (see FIG. 8). In other words, the driving assistance executor 144 executes traveling control such that the host vehicle M is allowed to travel in a straight direction using the function of LKAS. At this time, when the driver turns the steering wheel 82 to the right in a steering operation and the host vehicle M deviates from the current traveling lane, the driving assistance executor 144 performs an operation such that the steering wheel 82 performs a steering operation in a direction in which the traveling lane of the host vehicle M is returned to a current traveling lane using the function of RDM. In other words, the driving assistance executor 144 causes the steering wheel 82 to generate a force (a so-called reaction force) that repels the steering operation of the driver. At this time, the notification image generator 192 generates the notification image IM-1 including the second graphic F2 indicating that the traveling control of driving assistance is activated with respect to the driver's steering operation and causes the display device 32 to display the notification image IM-1. More specifically, the notification image generator 192 generates the notification image IM-1 in which the second graphic F2-2 corresponding to a direction in which the driver is performing the steering operation, i.e., a direction in which the reaction force is generated, is highlighted and causes the display device 32 to display the notification image IM-1. The method in which the second graphic F2-2 is highlighted may be based on any method such as blinking the arc of the second graphic F2-2. Thereby, the driver can perform a steering operation on the steering wheel 82 to return the traveling lane of the host vehicle M if the driver is not intentionally trying to change the traveling lane by visually recognizing the second graphic F2-2 highlighted in the notification image IM-1.

On the other hand, when the driver is intentionally trying to change the traveling lane of the host vehicle M, the driver continues the steering operation on the steering wheel 82. In this case, the driving assistance executor 144 allows the driver to change the traveling lane by stopping the generation of the reaction force based on the RDM function. At this time, the notification image generator 192 generates the notification image IM-1 including the second graphic F2 shown to prompt the driver to pay attention to the steering operation and causes the display device 32 to display the notification image IM-1. A method in which the driver is prompted to pay attention to the steering operation through the second graphic F2 may be based on any method. For example, the notification image generator 192 may indicate that it is necessary for the driver to pay attention to the direction of the second graphic F2-2, i.e., the right, by changing the color of the arc of the second graphic F2-2 corresponding to the direction in which the driver is performing the steering operation to, for example, "red" that is easily recognized by the driver (and blinking the arc of the second graphic F2-2). In FIG. 10, an example of a state in which the color of the arc of the second graphic F2-2 is "red" and the second graphic F2-2 is blinking in the notification image IM-1 is shown. Thereby, the driver can make the intended lane change while paying attention to a situation of a right traveling lane (a traveling state of another vehicle or the like) to which he or she is prompted to pay attention by visually recognizing the second graphic F2-2 within the notification image IM-1.

As described above, the vehicle system 1 can prompt the driver to pay attention to the lane change of the host vehicle M by the driver through vision (the notification image IM-1) and tactile (the reaction force generated by the steering wheel 82).

As described above, according to the vehicle control system of the embodiment, the automated driving controller 120 provided in the vehicle control device 100 performs traveling control related to the automated driving in the host vehicle M, the driving assistance controller 140 performs traveling control related to the driving assistance in the host vehicle M, and the traveling mode controller 160 performs traveling control related to the traveling mode in host vehicle M. In the vehicle control system of the embodiment, the driving control determiner 180 provided in the vehicle control device 100 determines on the driving mode of the automated driving, the degree of execution of the driving assistance, and the traveling mode in the host vehicle M in association with each type of traveling control. Thereby, in the vehicle control system of the embodiment, the host vehicle M is allowed to travel in the driving mode or the traveling mode that matches the driver's motivation for driving the host vehicle M, i.e., the driver's desire, and driving assistance can be provided for the driver appropriately in accordance with the driving state of the host vehicle M.

Furthermore, in the vehicle control system of the embodiment, the display processor 190 provided in the vehicle control device 100 generates a notification image based on the driver's gripping state of the steering wheel 82, the determined motivation of the driver, and the presence or absence of execution of traveling control and/or the degree of execution of the traveling control in the determined driving assistance. In the vehicle control system of the embodiment, a notification is visually provided to the driver by causing the display device 32 to display the generated notification image. Thereby, in the vehicle control system of the embodiment, it is possible to easily notify the driver of the driver's motivation for driving the host vehicle M and the content of the traveling control of driving assistance being executed in the host vehicle M.

The embodiment described above can be represented as follows.

A vehicle control system including:
a hardware processor; and
a storage device storing a program,
wherein the hardware processor reads and executes the program stored in the storage device to:
receive a steering operation on a steering operation element of a vehicle by a driver;
detect a gripping state of the steering operation element by the driver of the vehicle; and
when a display device is allowed to display a notification image indicating at least the gripping state and including a first graphic deformable on the basis of a circle within an entire image area, cause the display device to display the notification image including the first graphic deformed to expand a location corresponding to a part where the driver is gripping the steering operation element.

In the embodiment, the case where driving assistance corresponding to the level of the driver's motivation is provided to the driver in the host vehicle M equipped with an automated driving function and the driver is visually notified of the content of the traveling control of the driving assistance being executed in the host vehicle M through the notification image IM has been described. However, the function of providing the driver with driving assistance according to the level of the driver's motivation and the function of visually notifying the driver of the content of the traveling control of driving assistance through the notification image IM can be provided to the driver even in the vehicle in which the automated driving function is not provided. That is, in the vehicle control device 100, even if the automated driving controller 120 is omitted, the function of providing the driver with driving assistance corresponding to the level of the driver's motivation and the function of visually notifying the driver of the content of the traveling control of the driving assistance through the notification image IM can be implemented. In relation to the configuration and process of the vehicle control device in this case, the determination of level 1 of the driver's motivation is omitted only in the driving control determiner 180 of the embodiment and it is only necessary for the other configuration and process to be equivalent to the configuration and process of the vehicle control device 100 of the embodiment. Therefore, even in a vehicle in which the automated driving controller 120 is omitted, the function of notifying the driver of the content of the traveling control of driving assistance is similar to that in the configuration and process in the vehicle control device 100 of the embodiment.

In the embodiment, the gripping state of the steering wheel 82, i.e., the combination of the gripping position and the number of grips, and the driver's visual line direction are used to determine the driver's motivation for driving. However, the information used to determine the driver's motivation is not limited to these items. For example, information about the strength with which the driver grips the steering wheel 82 may be further added as the gripping state of the steering wheel 82. In this case, the motivation level of the driver may be determined on the basis of the strength with which the driver grips the steering wheel 82 as in the embodiment or the motivation level of the driver may be determined to be divided into more levels. Because it is possible to similarly conceive the configuration and process of the vehicle control device (the configuration and process related to the generation of the notification image IM) in this case on the basis of the configuration and process of the vehicle control device 100 of the embodiment, the description of the determination of the level of the driver's motivation including the strength of the gripping of the steering wheel 82 is omitted.

Although modes for carrying out the present invention have been described using embodiments, the present invention is not limited to the embodiments and various modifications and substitutions can also be made without departing from the scope and spirit of the present invention.

What is claimed is:

1. A vehicle control system comprising:
   a steering operation element configured to receive a steering operation of a vehicle by a driver;
   a grip detector configured to detect a gripping state of the steering operation element by the driver of the vehicle for each of a plurality of parts into which the steering operation element is divided; and
   a display processor configured to cause a display device to display a notification image indicating at least the gripping state,
   wherein the notification image includes a first graphic deformable based on a circle within an entire image area, and
   wherein the display processor causes the display device to display the notification image including the first graphic deformed to expand, in a radial direction of the circle and to outside of the circle, only a location corresponding to a part of the circle where the driver is gripping the steering operation element.

2. The vehicle control system according to claim 1,
   wherein the display processor increases a diameter of the circle in the first graphic as the number of parts in which the steering operation element is detected to be gripped increases.

3. The vehicle control system according to claim 2,
   wherein the grip detector detects the gripping state in each of a first gripping part in an upper region of the steering operation element, a second gripping part in a right region of the steering operation element, a third gripping part in a lower region of the steering operation element, and a fourth gripping part in a left region of the steering operation element, and
   wherein the display processor changes a diameter of the circle in the first graphic based on a gripping position of the steering operation element and the number of grips of the driver.

4. The vehicle control system according to claim 3,
   wherein, if the number of grips is 2, the display processor changes the diameter of the circle in the first graphic to a longest first length when the gripping position corresponds to the second gripping part and the fourth gripping part and changes the diameter of the circle in the first graphic to a second length shorter than the first length when the gripping position corresponds to the first gripping part and/or the third gripping part,
   wherein, if the number of grips is 1, the display processor changes the diameter of the circle in the first graphic to a third length shorter than the second length when the gripping position corresponds to the second gripping part or the fourth gripping part and changes the diameter of the circle in the first graphic to a fourth length shorter than the third length when the gripping position corresponds to the first gripping part or the third gripping part, and
   wherein, if the number of grips is 0, the display processor changes the diameter of the circle in the first graphic to a fifth length shorter than the fourth length.

5. The vehicle control system according to claim 1,
   wherein the display processor changes colors of the entire image area and/or the first graphic in accordance with the gripping state.

6. The vehicle control system according to claim 1, further comprising a traveling controller configured to perform traveling control related to steering and acceleration or deceleration of the vehicle determined based on the gripping state,
   wherein the notification image further includes a circular second graphic which is located outside of the first graphic in a radial direction of the circle and in which at least lengths of diameters of inner and outer circles and degrees of definition of the inner and outer circles can be changed, and
   wherein the display processor causes the display device to display the notification image including the first graphic and the second graphic obtained by changing any one of the length of the diameter of the inner circle, the length of the diameter of the outer circle, and the degrees of definition in accordance with a state of the determined traveling control.

7. The vehicle control system according to claim 6,
   wherein the second graphic is divided into at least a right area and a left area,
   wherein the traveling controller causes the steering operation element to generate a reaction force such that a traveling direction of the vehicle becomes a straight direction when the steering operation element has been operated in a direction outside of the straight direction by the driver using the straight direction of the vehicle as a reference, and
   wherein the display processor highlights one of the right area and the left area corresponding to a direction in which the traveling controller causes the reaction force to be generated.

8. The vehicle control system according to claim 7,
   wherein the traveling controller causes the reaction force generated by the steering operation element to stop when a driver's operation on the steering operation element in the direction outside of the straight direction has continued, and
   wherein the display processor causes a color of an image area on a side of the highlighted area within the entire image area of the notification image to be changed to a color different from that of another image area.

9. A vehicle control method comprising:
   receiving, by a computer mounted in a vehicle, a steering operation on a steering operation element of the vehicle by a driver;
   detecting, by the computer, a gripping state of the steering operation element by the driver of the vehicle for each of a plurality of parts into which the steering operation element is divided; and
   when a display device is allowed to display a notification image indicating at least the gripping state and including a first graphic deformable based on a circle within an entire image area, causing, by the computer, the display device to display the notification image including the first graphic deformed to expand, in a radial direction of the circle and to outside of the circle, only a location corresponding to a part of the circle where the driver is gripping the steering operation element.

10. A non-transitory computer-readable storage medium storing a program for causing a computer mounted in a vehicle to:
    receive a steering operation on a steering operation element of the vehicle by a driver;

detect a gripping state of the steering operation element by the driver of the vehicle for each of a plurality of parts into which the steering operation element is divided; and when a display device is allowed to display a notification image indicating at least the gripping state and including a first graphic deformable based on a circle within an entire image area, cause the display device to display the notification image including the first graphic deformed to expand, in a radial direction of the circle and to outside of the circle, only a location corresponding to a part of the circle where the driver is gripping the steering operation element.

* * * * *